(12) United States Patent
Nishikawa

(10) Patent No.: US 10,250,850 B2
(45) Date of Patent: Apr. 2, 2019

(54) COMMUNICATION CONTROL METHOD, COMMUNICATION CONTROL APPARATUS, TELEPRESENCE ROBOT, AND RECORDING MEDIUM STORING A PROGRAM

(71) Applicant: Panasonic Intellectual Property Management Co., Ltd., Osaka (JP)

(72) Inventor: Yuri Nishikawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/973,457

(22) Filed: May 7, 2018

(65) Prior Publication Data

US 2018/0338116 A1 Nov. 22, 2018

(30) Foreign Application Priority Data

May 22, 2017 (JP) .................................. 2017-100760

(51) Int. Cl.
*H04N 7/14* (2006.01)
*H04N 7/15* (2006.01)
*H04L 29/06* (2006.01)
*G05D 1/00* (2006.01)

(52) U.S. Cl.
CPC ............ *H04N 7/15* (2013.01); *G05D 1/0022* (2013.01); *G05D 1/0088* (2013.01); *H04L 65/4038* (2013.01); *Y10S 901/01* (2013.01)

(58) Field of Classification Search
USPC ..................................................... 348/14.01
See application file for complete search history.

(56) References Cited

U.S. PATENT DOCUMENTS

| | | | | |
|---|---|---|---|---|
| 6,535,793 B2* | 3/2003 | Allard | .................... | B25J 9/1689 |
| | | | | 318/628 |
| 8,463,435 B2* | 6/2013 | Herzog | ...................... | B25J 5/00 |
| | | | | 700/248 |
| 8,515,577 B2* | 8/2013 | Wang | .................... | B25J 9/1689 |
| | | | | 700/247 |
| 9,014,848 B2* | 4/2015 | Farlow | .................. | B25J 11/009 |
| | | | | 700/245 |
| 9,044,863 B2* | 6/2015 | Mead | ..................... | B25J 9/1697 |
| 9,138,891 B2* | 9/2015 | Herzog | ...................... | B25J 5/00 |
| 9,174,342 B2* | 11/2015 | Pinter | .................... | G06Q 50/22 |
| 9,283,674 B2* | 3/2016 | Hoffman | ................. | B25J 9/161 |
| 2012/0197464 A1* | 8/2012 | Wang | .................... | B25J 9/1689 |
| | | | | 701/2 |

FOREIGN PATENT DOCUMENTS

JP        8-256219        10/1996

* cited by examiner

*Primary Examiner* — Maria El-Zoobi
(74) *Attorney, Agent, or Firm* — Greenblum & Bernstein, P.L.C.

(57) ABSTRACT

A private conversation request is received from a first communication apparatus, and a region of fixed range based on the position of a first user is set as a first conversation-listening area. Based on a position management database, a second communication apparatus positioned inside the first conversation-listening area from among one or a plurality of second communication apparatus is detected as a first evacuation communication apparatus, and an evacuation order causing the first evacuation communication apparatus to be evacuated from the first conversation-listening area is transmitted to the first evacuation communication apparatus.

15 Claims, 10 Drawing Sheets

33

| TERMINAL ID | ROBOT ID | POSITION | CLOSEST USER ID |
|---|---|---|---|
| - | A | Xa, Ya, Za | UA |
| - | B | Xb, Yb, Zb | UB |
| - | C | Xc, Yc, Zc | UZ |
| α | - | Xα, Yα, Zα | X |

37

| ROBOT ID | COMMUNICATION STATUS | CALLEE |
|---|---|---|
| A | CONNECTED | C |
| B | IDLE | |
| C | CONNECTED | A |

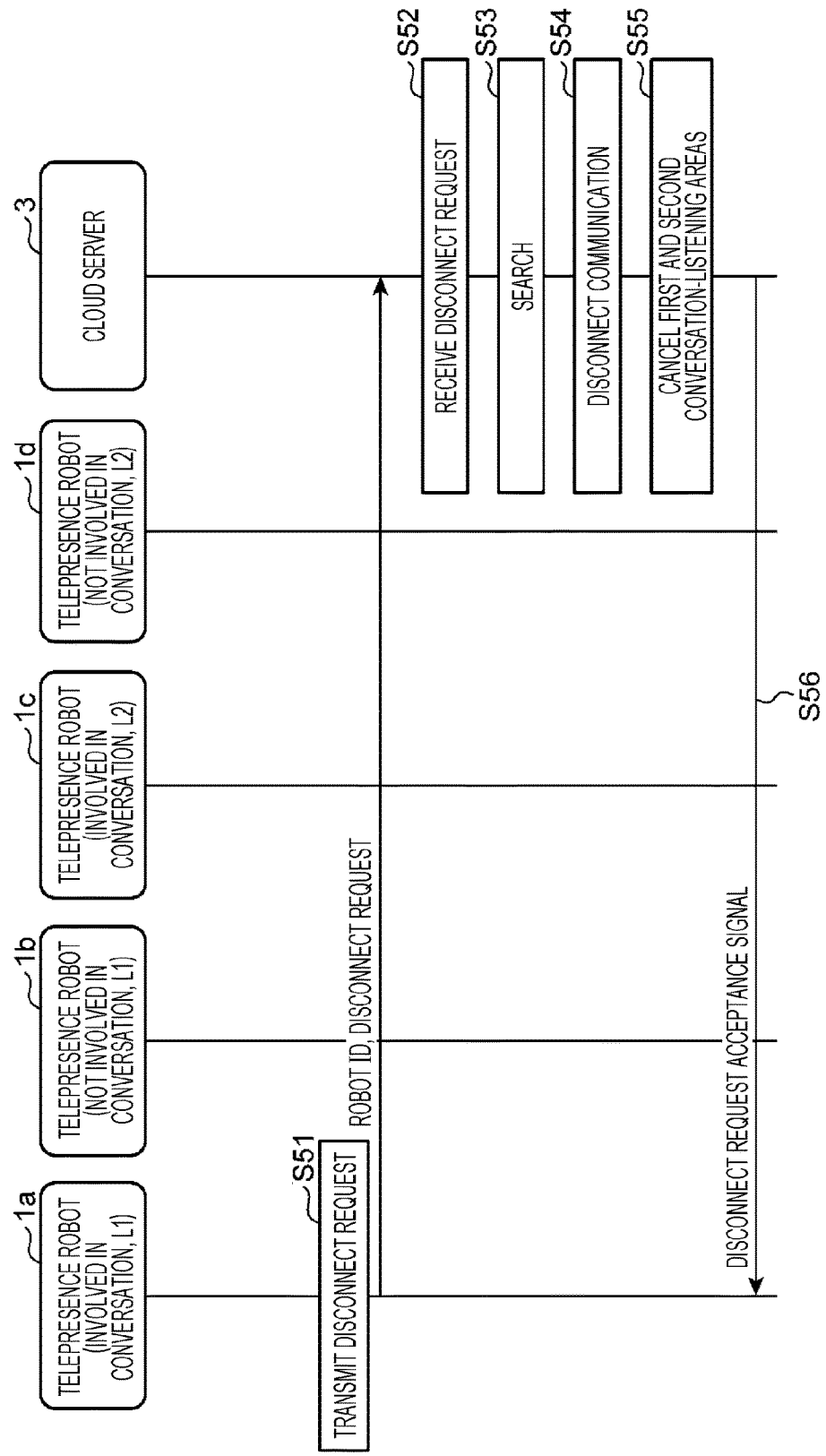

COMMUNICATION CONTROL METHOD, COMMUNICATION CONTROL APPARATUS, TELEPRESENCE ROBOT, AND RECORDING MEDIUM STORING A PROGRAM

BACKGROUND

1. Technical Field

The present disclosure relates to a communication system provided with a first communication apparatus used by a first user, one or a plurality of self-propelled second communication apparatus placed inside the first space, and a communication control apparatus that controls communication between the first and second communication apparatus.

2. Description of the Related Art

In the case of holding a videoconference or a teleconference between remote locations, there is a need for specific persons among the people participating in the conference to be able to converse with each other only. To address this need, for example, Japanese Unexamined Patent Application Publication No. 8-256219 discloses the technology below. Namely, in a multipoint videoconferencing system that holds a videoconference among multiple locations, if a private conversation request for privately conversing with a terminal apparatus 1_N is input into a terminal apparatus 1_1, voice signals transmitted from the terminal apparatus 1_1 and the terminal apparatus 1_N are transmitted to the terminal apparatus 1_1 and the terminal apparatus 1_N only. With this arrangement, a conversation between the speakers of the terminal apparatus 1_1 and the terminal apparatus 1_N is kept from being heard by the speakers of the other terminal apparatus 1_2 to 1_N−1.

SUMMARY

In one general aspect, the techniques disclosed here feature a communication control method of a communication control apparatus that controls a first communication apparatus used by a first user inside a first space, and one or a plurality of self-propelled second communication apparatus placed inside the first space, the communication control apparatus being provided with a position management database in which position information indicating a current position of each of the one or plurality of second communication apparatus is registered. The communication control method includes: receiving a private conversation request that requests a private conversation from the first communication apparatus; acquiring a position of the first user when the private conversation request is input into the first communication apparatus by the first user; setting a region of fixed range based on the position of the first user as a first conversation-listening area; detecting, based on the position management database, a second communication apparatus positioned inside the first conversation-listening area from among the one or plurality of second communication apparatus as a first evacuation communication apparatus; and transmitting, to the first evacuation communication apparatus, an evacuation order causing the first evacuation communication apparatus to evacuate to an outside of the first conversation-listening area.

According to the present disclosure, a second communication apparatus detected as a first evacuation communication apparatus is evacuated to the outside of a first conversation-listening area. Consequently, a user who uses the second communication apparatus which has been evacuated to the outside of the first conversation-listening area, namely, a user who is not involved in a private conversation, is deterred from listening to the private conversation and is also deterred from noticing that the private conversation is occurring.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 12 is a sequence diagram illustrating an example of a process for canceling the setting of the first and second conversation-listening areas in the communication system according to Embodiment 2 of the present disclosure.

Figure 1:
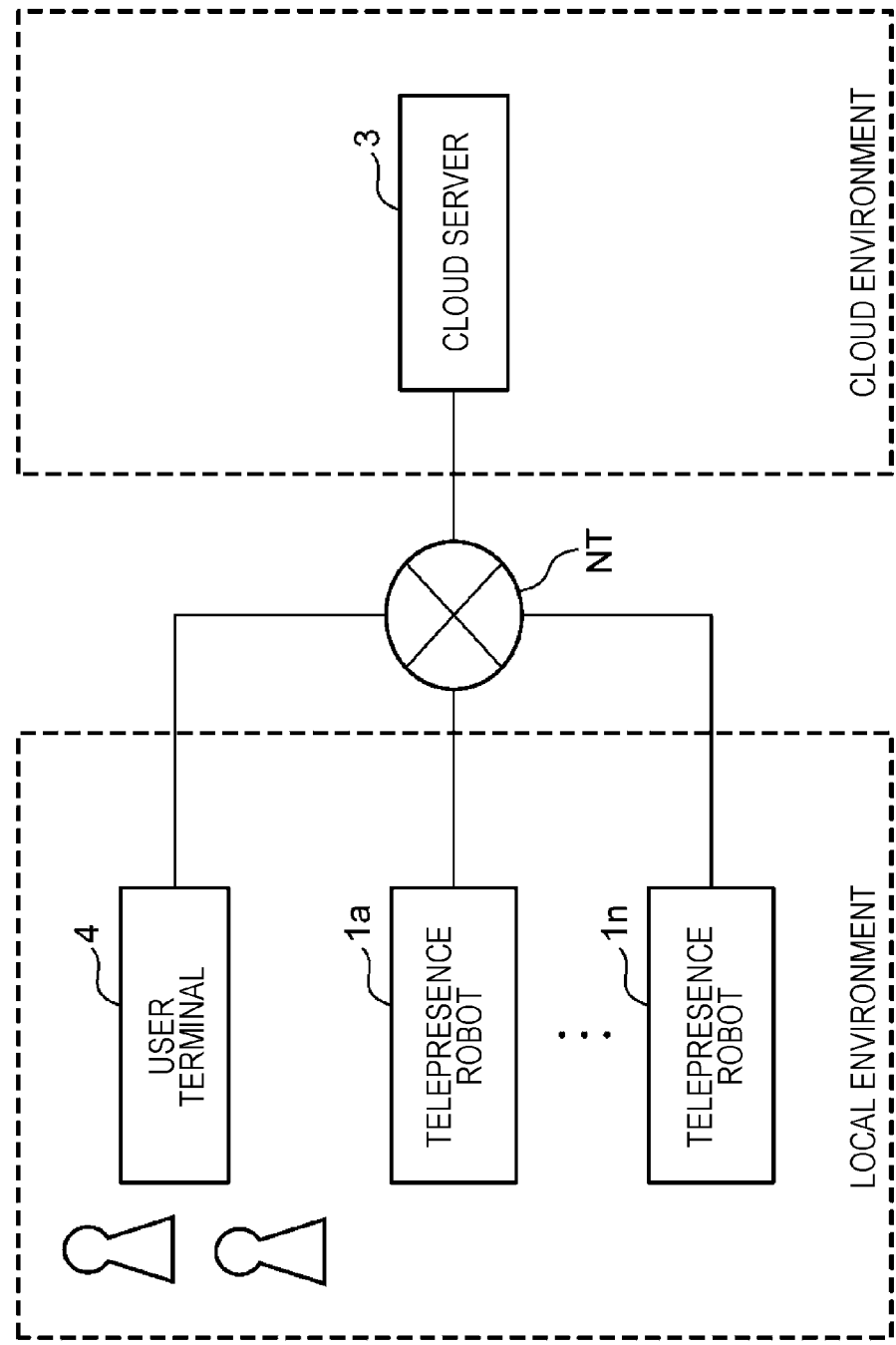
FIG. 1 is a diagram illustrating an example of an overall configuration of a communication system according to Embodiment 1 of the present disclosure.

DETAILED DESCRIPTION (Underlying Knowledge Forming Basis of the Present Disclosure)

Recently, the ability for robots to communicate with humans has been improving by the day, and telepresence robots are being developed in which videoconferencing technology, remote control technology, and the like are built into an autonomous mobile robot. A telepresence robot acts as the caller user's avatar, moving around various places in a remote location, conversing with callee users, and the like. With this arrangement, the telepresence robot is able to achieve favorable communication while also giving the callee users a novel sense of presence. As a result, telepresence robots are beginning to be adopted in work from home, various events, offices, the education field, and the like.

At this point, imagine a future office environment in which multiple telepresence robots and multiple people coexist.

A telepresence robot is placed in a first space, which corresponds to a space such as a home, an event hall, an office, or a classroom. The telepresence robot moves autonomously inside the first space.

Additionally, a telepresence robot is also placed in a second space separate from the first space. Similarly to the first space, the second space is a space such as a home, an event hall, an office, or a classroom, for example.

The telepresence robot inside the first space transmits, to the telepresence robot inside the second space, voice data picked up using a microphone and image data captured using a camera. Also, the telepresence robot inside the first space outputs the voice data received from the telepresence robot inside the second space from a speaker, and displays the image data received from the telepresence robot inside the second space on a display.

The telepresence robot inside the second space transmits, to the telepresence robot inside the first space, voice data picked up using a microphone and image data captured using a camera. Also, the telepresence robot inside the second space outputs the voice data received from the telepresence robot inside the first space from a speaker, and displays the image data received from the telepresence robot inside the first space on a display.

By taking such a configuration, each of the user inside the first space and the user inside the second space, by operating the telepresence robot inside the first space and the telepresence robot inside the second space, become able to communicate through these telepresence robots.

In addition, communication similar to the above is possible by having the user inside the first space communicably connect a terminal apparatus (not illustrated) carried by the user to the telepresence robot inside the second space.

In the case in which a telepresence robot is placed in a space such as an office as described above, issues like the following are a focus of attention. For example, when holding conversations among multiple users inside an office, some conversations may contain content which may be overheard by users other than the multiple users, whereas other conversations may contain content that the multiple users do not want others to overhear, or in other words, private conversations. Additionally, a private conversation may be held between a user inside the first space and a user inside the second space in some cases.

For example, consider the case in which a user "X", a user "Y", and a telepresence robot are inside the first space. For example, suppose that the user "X" and the user "Y" are holding a private conversation in a low voice. Suppose that the private conversation contains content that the user "X" and the user "Y" inside the first space do not want others to overhear.

In this case, if the telepresence robot is at a position where the microphone of the telepresence robot is able to pick up the low voices of the user "X" and the user "Y", the private conversation will be picked up by the microphone of the telepresence robot, even if the user "X" and the user "Y" are holding the private conversation in a low voice.

Also, if the telepresence robot in the first space described above is being used by a user "Z" other than the user "X" and the user "Y", there is an issue of the user "Z" also learning the content of the private conversation.

In addition, if the telepresence in the first space described above and the telepresence robot in the second space are communicating, voice data corresponding to the private conversation will be transmitted from the telepresence robot in the first space to the telepresence robot in the second space, and output from the speaker of the telepresence robot in the second space. Thus, there is an issue of the user who uses the telepresence robot in the second space also learning the content of the private conversation.

Herein, to deter a user not involved in the private conversation from hearing the content of the private conversation, it is conceivable to adopt a mode in which a telepresence robot near a user having a private conversation is put into an unavailable state.

However, if this mode is adopted, in the case in which the user "Z" not involved in the private conversation attempts to communicably connect the telepresence robot near the users "X" and "Y" holding the private conversation with the telepresence robot in the second space to converse with a user "W" in the second space, since the telepresence is in an unavailable state, the user "Z" not involved in the private conversation notices, by the unavailable state, that a private conversation is occurring. Additionally, if a telepresence robot in an office environment is put into an unavailable state, there is also an issue of lowered utilization efficiency of the telepresence robot in the office environment.

In Japanese Unexamined Patent Application Publication No. 8-256219, when entering the private conversation mode, the existence of the terminal apparatus currently in the private conversation mode is reported to the communication terminals not in the private conversation mode, and thus speakers who are not participating in the private conversation become aware that a private conversation is currently occurring between specific speakers. By the very nature of a private conversation, it is undesirable for others to be aware of the occurrence of the private conversation, and for this reason, Japanese Unexamined Patent Application Publication No. 8-256219 does not fully satisfy the demands of speakers who engage in private conversations. Also, Japanese Unexamined Patent Application Publication No. 8-256219 has a problem in that, when entering the private conversation mode, telephony becomes unavailable to terminal apparatus not in the private conversation mode, thereby inhibiting the effective utilization of communication resources.

Accordingly, the present disclosure provides a technology that deters a user who uses a communication apparatus not involved in a private conversation from listening to the private conversation and also from noticing that the private conversation is occurring.

A communication method according to one aspect of the present disclosure is a communication control method of a communication control apparatus that controls a first communication apparatus used by a first user inside a first space, and one or a plurality of self-propelled second communication apparatus placed inside the first space, the communication control apparatus being provided with a position management database in which position information indicating a current position of each of the one or plurality of second communication apparatus is registered, the communication control method comprising:

receiving a private conversation request that requests a private conversation from the first communication apparatus;

acquiring a position of the first user when the private conversation request is input into the first communication apparatus by the first user;

setting a region of fixed range based on the position of the first user as a first conversation-listening area;

detecting, based on the position management database, a second communication apparatus positioned inside the first conversation-listening area from among the one or plurality of second communication apparatus as a first evacuation communication apparatus; and transmitting, to the first evacuation communication apparatus, an evacuation order causing the first evacuation communication apparatus to evacuate to an outside of the first conversation-listening area.

According to this aspect, when a private conversation request is received from the first communication apparatus, a region inside a fixed range based on the position of the first user is set as a first conversation-listening area, and the second communication apparatus inside the first conversation-listening area is evacuated to the outside of the first conversation-listening area. With this arrangement, the second communication apparatus is positioned outside of the first conversation-listening area. Consequently, a user who uses the second communication apparatus which has been evacuated to the outside of the first conversation-listening area, namely, a user who is not involved in the private conversation, no longer enters the first conversation-listening area due to using the second communication apparatus. For this reason, the user not involved in the private conversation who uses the second communication apparatus may be deterred from listening to the private conversation, without putting the second communication apparatus into an unavailable state. Also, since this aspect does not put the second communication apparatus into an unavailable state, the user not involved in the private conversation is deterred from noticing that the private conversation is occurring. Also, since the second communication apparatus is not put into an unavailable state, the utilization efficiency of the second communication apparatus may be increased.

The above aspect may also be configured so that, after receiving the private conversation request, if a private conversation cancellation request that requests cancellation of the private conversation request is received from the first communication apparatus, the setting of the first conversation-listening area is canceled.

According to this aspect, in the case of receiving a private conversation cancellation request from the first communication apparatus, the setting of the first conversation-listening area is canceled, thereby avoiding a situation in which the first conversation-listening area continues to be set even though the private conversation has ended.

The above aspect may also be configured so that the first evacuation communication apparatus includes a second communication apparatus having an established communication connection with a third communication apparatus placed inside a second space separate from the first space.

According to this aspect, when the private conversation request is received, even if the second communication apparatus is being used for a call by a user not involved with the private conversation in the first conversation-listening area, the second communication apparatus is evacuated from the first conversation-listening area. For this reason, the user who uses the second communication apparatus and the remote user on a call with the user may be deterred from listening to the private conversation.

The above aspect may also be configured so that the communication control apparatus additionally controls one or a plurality of self-propelled third communication apparatus placed in the second space, in the position management database, position information indicating the current position of each of the one or plurality of third communication apparatus is registered, the communication control method further comprises:

acquiring a position of a second user inside the second space who uses the third communication apparatus in a case in which the input of the private conversation request is received from the first communication apparatus in a state of an established communication connection between the first communication apparatus and one among the one or plurality of third communication apparatus;

setting a region of fixed range based on the position of the second user as a second conversation-listening area;

detecting, based on the position management database, a third communication apparatus positioned inside the second conversation-listening area and also different from the third communication apparatus having an established communication connection with the first communication apparatus from among the one or plurality of third communication apparatus as a second evacuation communication apparatus; and transmitting, to the second evacuation communication apparatus, an evacuation order causing the second evacuation communication apparatus to evacuate to an outside of the second conversation-listening area.

According to this aspect, when a private conversation request is received in a situation in which the first user and the second user in a remote location are on a call through the first communication apparatus and the third communication apparatus, the second communication apparatus near the position of the first user is evacuated from the first conversation-listening area, while in addition, a third communication apparatus near the position of the second user which is different from the third communication apparatus used by the second user is also evacuated to the outside of a second conversation-listening area. For this reason, the second communication apparatus is positioned outside of the first conversation-listening area, and the third communication apparatus is positioned outside of the second conversation-listening area. Consequently, a user who uses the second communication apparatus which has been evacuated to the outside of the first conversation-listening area, namely, a user who is not involved in the private conversation, no longer enters the first conversation-listening area due to using the second communication apparatus. Furthermore, a user who uses the third communication apparatus which has been evacuated to the outside of the second conversation-listening area, namely, a user who is not involved in the private conversation, no longer enters the second conversation-listening area due to using the third communication apparatus.

For this reason, the users not involved in the private conversation who use the second communication apparatus and the third communication apparatus may be deterred from listening to the private conversation, without putting each of the second communication apparatus and the third communication apparatus into an unavailable state.

Also, since this aspect does not put each of the second communication apparatus and the third communication apparatus into an unavailable state, the user who uses the second communication apparatus and the user who uses the third communication apparatus not involved in the private conversation are deterred from noticing that the private conversation is occurring. Also, since each of the second communication apparatus and the third communication apparatus is not put into an unavailable state, the utilization efficiency of each of the second communication apparatus and the third communication apparatus may be increased.

The above aspect may also be configured so that after receiving the private conversation request, if a disconnect request that requests disconnection of the communication connection is received from the first communication apparatus or the third communication apparatus having an established communication connection with the first communication apparatus, the communication connection between the first communication apparatus and the third communication apparatus having an established communication connection with the first communication apparatus is disconnected, and the setting of the first conversation-listening area and the second conversation-listening area is canceled.

According to this aspect, in a situation in which the first user is holding a private conversation with the second user in a remote location through the first communication apparatus and the third communication apparatus, when a disconnect request is received, the setting of first conversation-listening area and the second conversation-listening area is canceled, thereby avoiding a situation in which the first and second conversation-listening areas continue to be set even though the private conversation between the first user and the second user has ended.

The above aspect may also be configured so that the second evacuation communication apparatus includes a third communication apparatus having an established communication connection with the second communication apparatus.

According to this aspect, when the private conversation request is received, in the case in which the third communication apparatus is being used for a call by a user not involved with the private conversation in the second conversation-listening area, the third communication apparatus is also evacuated from the second conversation-listening area. For this reason, by following the third communication apparatus, the user may be evacuated from the second conversation-listening area and deterred from listening to the content of the private conversation.

The above aspect may also be configured so that each of the one or plurality of second communication apparatus is configured as a telepresence robot that presents a message transmitted from the third communication apparatus with which a communication connection is established, and the telepresence robot is provided with a communicator that transmits the message to the third communication apparatus with which the communication connection is established, an autonomous movement controller that causes the telepresence robot to move autonomously, and a presenter that presents the message received from the third communication apparatus with which the communication connection is established to a user who uses the telepresence robot.

According to this aspect, in the case in which the second communication apparatus is configured as a telepresence robot, the user not involved with the private conversation who uses the second communication apparatus may be deterred from listening to the private conversation and also from noticing that the private conversation is occurring, without putting the telepresence robot near the first user in an unavailable state.

The above aspect may also be configured so that when the private conversation request is received, position information indicating the current position of the first communication apparatus additionally is received, and the position indicated by the position information of the first communication apparatus is acquired as the position of the first user.

According to this aspect, when the private conversation request is received, the position indicated by the position information of the first communication apparatus is acquired as the position of the first user, and thus the position of the first user may be acquired accurately and reliably.

In the above aspect, in the detection of the first evacuation communication apparatus, in the case in which there are multiple second communication apparatus positioned inside the first conversation-listening area, each of the multiple second communication apparatus may be detected as the first evacuation communication apparatus.

With this arrangement, all second communication apparatus positioned inside the first conversation-listening area may be evacuated to the outside of the first conversation-listening area.

In the above aspect, in the detection of the first evacuation communication apparatus, in the case in which there are multiple second communication apparatus positioned inside the first conversation-listening area, each of the multiple second communication apparatus may be detected as the first evacuation communication apparatus, while in the detection of the second evacuation communication apparatus, in the case in which there are multiple third communication apparatus positioned inside the second conversation-listening area, each of the third second communication apparatus may be detected as the second evacuation communication apparatus.

With this arrangement, all second communication apparatus positioned inside the first conversation-listening area may be evacuated to the outside of the first conversation-listening area, and all third communication apparatus positioned inside the second conversation-listening area may be evacuated to the outside of the second conversation-listening area.

The above aspect may also be configured so that when the private conversation request is received, the position of the third communication apparatus is acquired from the position management database, and the acquired position of the third communication apparatus is acquired as the position of the second user.

According to this aspect, the position of the second user when the private conversation request is received may be acquired accurately and reliably.

The above aspect may also be configured so that, while the first conversation-listening area is set, if a second communication apparatus entering the first conversation-listening area is detected from among the one or plurality of second communication apparatus, an evacuation order causing the entering second communication apparatus to evacuate to the outside of the first conversation-listening area is transmitted to the entering second communication apparatus.

According to this aspect, if the second communication apparatus newly enters the first conversation-listening area while the first conversation-listening area is set, the second communication apparatus may be evacuated to the outside of the first conversation-listening area, thereby deterring the second communication apparatus from entering the first conversation-listening area. For this reason, while the first conversation-listening area is set, a user not involved in the private conversation may be deterred from entering the first conversation-listening area due to using the second communication apparatus, and may be deterred from listening to the private conversation.

Note that the effects and advantages of the communication control method described above are also realized by a communication control apparatus and a telepresence robot that form a communication system, and also by a computer program that causes a computer to execute the communication control method. The computer program may be distributed on a non-transitory computer-readable recording medium such as CD-ROM, or over a communication network such as the Internet.

Note that the embodiments described hereinafter all illustrate specific examples of the present disclosure. Features such as numerical values, shapes, structural elements, steps, and the ordering of steps indicated in the following embodiments are merely examples, and are not intended to limit the present disclosure. In addition, among the structural elements in the following exemplary embodiments, structural elements that are not described in the independent claim indicating the broadest concept are described as arbitrary or optional structural elements. Furthermore, the individual contents in all of the embodiments may also be combined.

Embodiment 1

FIG. 1 is a diagram illustrating an example of an overall configuration of a communication system according to Embodiment 1 of the present disclosure. The communication apparatus illustrated in FIG. 1 is provided with multiple telepresence robots 1a to 1n, a cloud server 3, and a user terminal 4. In the present embodiment, each of the telepresence robots 1a to 1n is an example of the second communication apparatus.

The telepresence robots 1a to 1n are autonomous mobile robots with built-in videoconferencing technology and remote control technology or the like, which act as the caller user's avatar, moving around various places in a remote location, holding conversations and the like with callee users, and conveying messages from the caller user to callee users.

The cloud server 3 includes a processor, memory, a communication apparatus, an external storage apparatus, and the like, for example, and is communicably connected to the multiple telepresence robots 1a to 1n and the user terminal 4 via a wired or wireless network NT. For the network NT, a WAN such as the Internet may be adopted. The cloud server 3 is an example of a communication control apparatus that controls the communication of the user terminal 4 and the multiple telepresence robots 1a to 1n. Note that the communication control apparatus is not particularly limited to the cloud server 3, and may also be configured as a communication terminal such as a smartphone, a tablet, or a personal computer, or as a telepresence robot.

The user terminal 4 is a portable information processing apparatus such as a smartphone or a tablet, for example. The user terminal 4 is used in an office or the like in a remote location distant from the callee users, for example. The user terminal 4 is an example of the first communication apparatus used by the first user. Note that the user terminal 4 is not particularly limited to the above example, and may also be configured as multiple communication apparatus, as a stationary information processing apparatus such as a personal computer, or as a telepresence robot.

In the example in FIG. 1, multiple telepresence robots 1a to 1n are placed in a space where a first user who uses the user terminal 4 is present. The space in which the first user is present corresponds to the first space. The first space corresponds to a space such as a home, an event hall, an office, or a classroom, for example. The first space may also be called the local environment. Each of the telepresence robots 1a to 1n is used to call a second user, who corresponds to a user present in a second space corresponding to a separate space from the first space. For example, for each of the telepresence robots 1a to 1n, a communication connection may or may not be established with a telepresence robot placed in the second space.

Also, the cloud server 3 is installed in a space separate from the space where the first user is present. The space where the cloud server 3 is installed may also be called the cloud environment.

Figure 2:
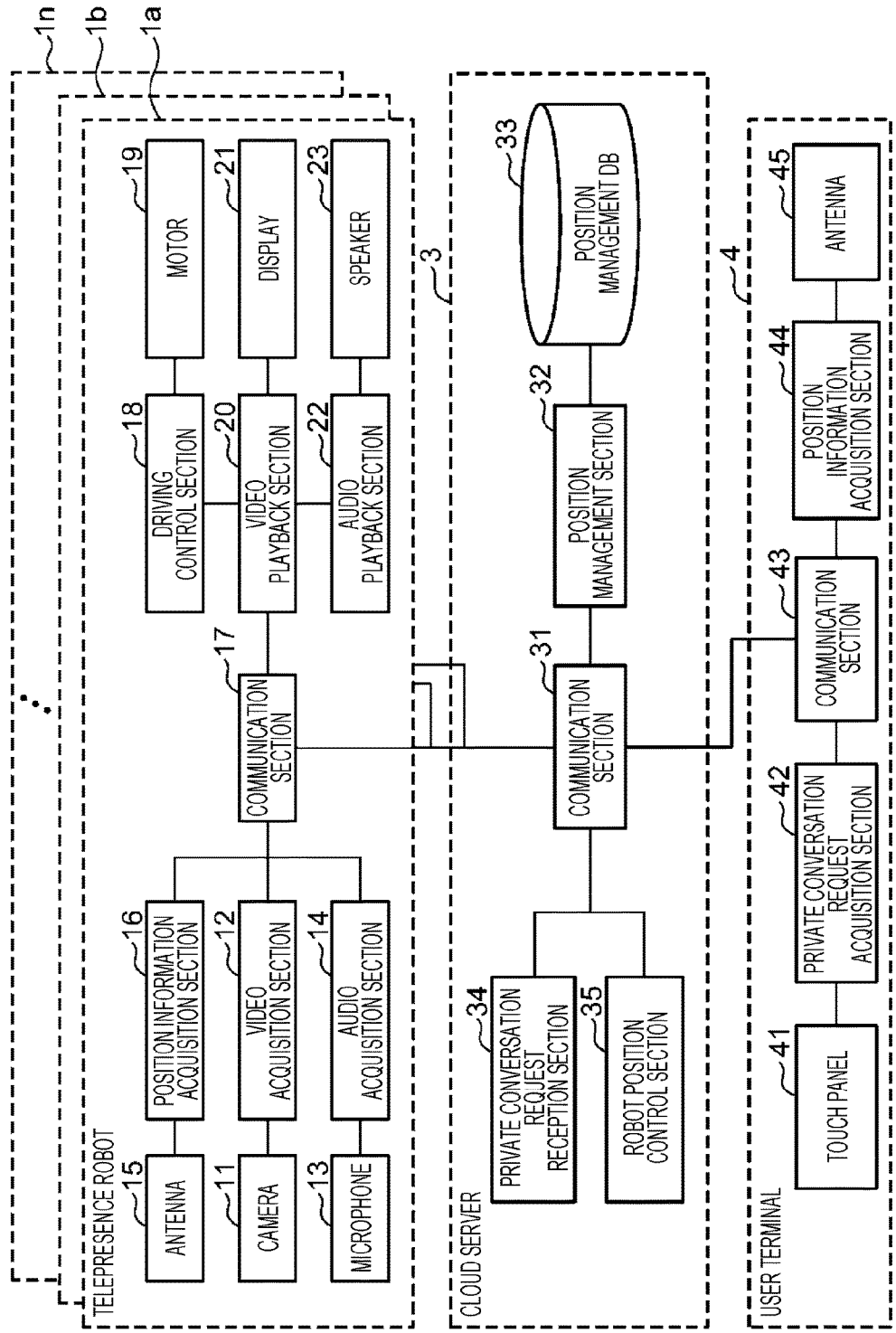
FIG. 2 is a block diagram illustrating a detailed configuration of the communication system illustrated in FIG. 1.

FIG. 2 is a block diagram illustrating a detailed configuration of the communication system illustrated in FIG. 1. Herein, the configuration of the telepresence robot 1a will be described. Since the configuration and operation of the telepresence robots 1b to 1n are similar to the configuration and operation of the telepresence robot 1a, detailed description is omitted herein. The telepresence robot 1a is provided with a camera 11, a video acquisition section 12, a microphone 13, an audio acquisition section 14, an antenna 15, a position information acquisition section 16, a communication section 17, a driving control section 18, a motor 19, a video playback section 20, a display 21, an audio playback section 22, and a speaker 23.

For example, the telepresence robot 1a is provided with a processor such as a central processing unit (CPU) which is not illustrated, and memory that stores a program for realizing the functions of the telepresence robot 1a. By having the processor execute the program, the video acquisition section 12, the audio acquisition section 14, the position information acquisition section 16, the driving control section 18, the video playback section 20, and the audio playback section 22 function. Alternatively, the video acquisition section 12, the audio acquisition section 14, the position information acquisition section 16, the driving control section 18, the video playback section 20, and the audio playback section 22 may be configured using integrated circuits that realize the functions corresponding to each section.

The communication section 17 may also include a communication circuit (not illustrated), for example. The processor may also be configured to execute a program to thereby control the communication circuit and function as the communication section 17. Alternatively, the communication section 17 may be configured using an integrated circuit that realizes the functions of a communication section.

The cloud server 3 is provided with a communication section 31, a position management section 32, a position management database (DB) 33, a private conversation request reception section 34, and a robot position control section 35.

For example, the cloud server 3 is provided with a processor such as a CPU which is not illustrated, and memory that stores a program for realizing the functions of the cloud server 3. By having the processor execute the program, the position management section 32, the private conversation request reception section 34, and the robot position control section 35 function. Alternatively, the position management section 32, the private conversation request reception section 34, and the robot position control section 35 may be configured using integrated circuits that realize the functions corresponding to each section.

The communication section 31 may also include a communication circuit (not illustrated), for example. The processor may also be configured to execute a program to thereby control the communication circuit and function as the communication section 31. Alternatively, the communication section 31 may be configured using an integrated circuit that realizes the functions of a communication section.

The user terminal 4 is provided with a touch panel 41, a private conversation request acquisition section 42, a communication section 43, a position information acquisition section 44, and an antenna 45.

The user terminal 4 is provided with a touch panel 41, a private conversation request acquisition section 42, a communication section 43, a position information acquisition section 44, and an antenna 45. For example, the user terminal 4 is provided with a processor such as a CPU which is not illustrated, and memory that stores a program for realizing the functions of the user terminal 4. By having the processor execute the program, the private conversation request acquisition section 42 and the position information acquisition section 44 function. Alternatively, the private conversation request acquisition section 42 and the position information acquisition section 44 may be configured using integrated circuits that realize the functions corresponding to each section.

The communication section 43 may also include a communication circuit (not illustrated), for example. The processor may also be configured to execute a program to thereby control the communication circuit and function as the communication section 43. Alternatively, the communication section 43 may be configured using an integrated circuit that realizes the functions of a communication section.

The camera 11 of the telepresence robot 1a is configured as an omnidirectional camera capable of acquiring an image in all directions, for example. The camera 11 captures all users positioned near the telepresence robot 1a continuously or on a predetermined interval, and outputs captured image data to the video acquisition section 12. Note that since the configuration and operation of the camera 11 of each of the telepresence robots 1b to 1n are similar to the configuration and operation of the camera 11 of the telepresence robot 1a, a description is omitted herein.

While the telepresence robot 1a is executing telepresence operations, the video acquisition section 12 of the telepresence robot 1a outputs image data capturing a user who uses the telepresence robot 1a to the communication section 17. The communication section 17 transmits the image data capturing the user to the cloud server 3.

Also, while the telepresence robot 1a is not executing telepresence operations and is in an idle state, the video acquisition section 12 outputs omnidirectional image data in all directions around the telepresence robot 1a to the communication section 17. The communication section 17 transmits the image data output from the video acquisition section 12, in association with a robot identifier (ID) that identifies the telepresence robot 1a, to the cloud server 3. In the cloud server 3, the image data captured by the camera 11 during the idle state is used to detect the user closest to the telepresence robot 1a. Note that in the idle state, the telepresence robot 1a moves around the local environment autonomously as appropriate, for example. Note that since the operation of the video acquisition section 12 of each of the telepresence robots 1b to 1n is similar to the operation of the video acquisition section 12 of the telepresence robot 1a, a description is omitted herein.

The microphone 13 of the telepresence robot 1a is configured as two or more nondirectional microphones, for example. The microphone 13 picks up sounds from all users positioned near the telepresence robot 1a continuously or on a predetermined interval, and outputs picked-up sound data to the audio acquisition section 14. Note that since the configuration and operation of the microphone 13 of each of the telepresence robots 1b to 1n are similar to the configuration and operation of the microphone 13 of the telepresence robot 1a, a description is omitted herein.

While the telepresence robot 1a is executing telepresence operations, the audio acquisition section 14 of the telepresence robot 1a outputs sound data picking up sounds from a user who is a target of the telepresence operations to the communication section 17. Also, when the telepresence robot 1a is in an idle state, the audio acquisition section 14 outputs sound data picking up sounds from all users positioned near the telepresence robot 1a to the communication section 17. Note that in the cloud server 3, the sound data picked up by the microphone 13 during the idle state is used to detect the user closest to the telepresence robot 1a. The communication section 17 outputs the sound data acquired by the audio acquisition section 14, in association with the robot ID, to the cloud server 3. Note that since the operation of the audio acquisition section 14 of each of the telepresence robots 1b to 1n is similar to the operation of the audio acquisition section 14 of the telepresence robot 1a, a description is omitted herein.

For example, the antenna 15 is configured as an antenna that supports the Bluetooth (registered trademark) Low Energy (BLE) standard, and receives a beacon signal transmitted from a transmitter installed near the telepresence robot 1a. Note that since the configuration and operation of the antenna 15 of each of the telepresence robots 1b to 1n are similar to the configuration and operation of the antenna 15 of the telepresence robot 1a, a description is omitted herein.

For example, the transmitter is configured as a transmitter that transmits a beacon signal conforming to the BLE communication protocol. The transmitter is installed in multiple locations at a fixed interval (for example, several meters) on the ceiling, floor, walls, or the like inside the building (for example, in rooms and hallways) where the telepresence robots 1a to 1n move. The transmitter transmits the beacon signal on a fixed cycle. The transmitter is provided with memory that stores position information indicating one's own installation position in advance, and transmits one's own position information included in the beacon signal. Note that the transmitter position information is expressed by the three components of latitude, longitude, and altitude, for example.

The position information acquisition section 16 of the telepresence robot 1a may also acquire the transmitter position information included in the beacon signal having the greatest signal strength from among the beacon signals received by the antenna 15 as the position information of the telepresence robot itself. Alternatively, the position information acquisition section 16 may compute position information of the telepresence robot 1a using the principle of triangulation from the position information of three points included in the beacon signals of transmitters at three points received by the antenna 15. The position information acquired by the position information acquisition section 16 is output to the communication section 17. The communication section 17 of the telepresence robot 1a transmits the position information output from the position information acquisition section 16, in association with the robot ID, to the cloud server 3.

The position information acquisition section 16 may also acquire or compute the position information of the telepresence robot 1a on a fixed cycle. The position information acquisition section 16 may also output the position information of the telepresence robot 1a to the communication section 17 every time the position information is acquired or computed.

Note that since the operations of the position information acquisition section 16 and the communication section 17 of each of the telepresence robots 1b to 1n are similar to the operations of the position information acquisition section 16 and the communication section 17 of the telepresence robot 1a, a description is omitted herein.

The communication section 31 of the cloud server 3 outputs to the position management section 32 every time the communication section 31 receives the position information and the robot ID transmitted from each of the telepresence robots 1a to 1n. The position management section 32 registers the position information and the robot ID received from each of the telepresence robots 1a to 1n in a position management DB.

The communication section 17 of the telepresence robot 1a is configured as a communication apparatus for connecting the telepresence robot 1a to the network NT. In the present embodiment, the communication section 17 particularly transmits the position information of the telepresence robot 1a acquired by the position information acquisition section 16, the image data acquired by the video acquisition section 12, and the sound data acquired by the audio acquisition section 14 to the cloud server 3.

The driving control section 18 controls the motor 19, thereby causing the telepresence robot 1a to move. In the present embodiment, in the case of receiving from the cloud server 3 an evacuation order described later which causes the telepresence robot 1a to evacuate from the first conversation-listening area, the driving control section 18 controls the motor 19 to evacuate the telepresence robot 1a from the first conversation-listening area. Note that in the case of receiving the evacuation order, the driving control section 18 controls the motor 19 to evacuate the telepresence robot 1a from the first conversation-listening area, regardless of whether the telepresence robot 1a is in the idle state or executing telepresence operations. With this arrangement, a user on a call through the telepresence robot 1a is evacuated from the first conversation-listening area following the evacuation of the telepresence robot 1a, and as a result, may be deterred from listening to a private conversation occurring inside the first conversation-listening area.

On the other hand, in the case in which the evacuation order is not being received from the cloud server 3 while in the idle state, the driving control section 18 controls the motor 19 to move the telepresence robot 1a appropriately. Also, in the case in which the evacuation order is not being received from the cloud server 3 during telepresence operations, the driving control section 18 may stop the motor 19. Note that since the operation of the driving control section 18 of each of the telepresence robots 1b to 1n is similar to the operation of the driving control section 18 of the telepresence robot 1a, a description is omitted herein.

The motor 19 drives drive wheels (omitted from illustration) in accordance with the control of the driving control section 18, causing the telepresence robot 1a to move or stop. The driving control section 18 and the motor 19 correspond to an example of an autonomous movement section for autonomous movement of the telepresence robot 1a. Note that since the operation of the motor 19 of each of the telepresence robots 1b to 1n is similar to the operation of the motor 19 of the telepresence robot 1a, a description is omitted herein.

The video playback section 20 of the telepresence robot 1a outputs, to the display 21, a video signal playing back video data of the caller user acquired from the cloud server 3 through the communication section 17. The caller user refers to the user who uses a telepresence robot to make a communication connection with the telepresence robot 1a. The display 21 displays video of the caller user and the like. The video playback section 20 and the display 21 correspond to an example of a presentation section. Note that since the operations of the video playback section 20 and the display 21 of each of the telepresence robots 1b to 1n are similar to the operations of the video playback section 20 and the display 21 of the telepresence robot 1a, a description is omitted herein.

The audio playback section 22 of the telepresence robot 1a outputs, to the speaker 23, an audio signal playing back sound data of the caller user acquired from the cloud server 3 through the communication section 17. The speaker 23 plays back audio of the caller user and the like. The audio playback section 22 and the speaker 23 correspond to an example of a presentation section. Note that since the operations of the audio playback section 22 and the speaker 23 of each of the telepresence robots 1b to 1n are similar to the operations of the audio playback section 22 and the speaker 23 of the telepresence robot 1a, a description is omitted herein.

The communication section 31 of the cloud server 3 communicates with each of the multiple telepresence robots 1a to 1n and the user terminal 4. For example, the communication section 31 receives position information indicating one's own current position transmitted in association with the robot ID from each of the telepresence robots 1a to 1n. Also, the communication section 31 receives image data and sound data transmitted in association with the robot ID from each of the telepresence robots 1a to 1n.

The position management section 32 registers position information indicating the current position of each of the telepresence robots 1a to 1n received by the communication section 31 in the position management DB 33.

In addition, the position management section 32 specifies the user closest to each of the telepresence robots 1a to 1n from the image data and the sound data received by the communication section 31, and registers a user ID of the specified user in the position management DB 33. With this arrangement, the position management section 32 registers the user closest to the telepresence robot 1a, the user closest to the telepresence robot 1b, and so on to the user closest to the telepresence robot 1n. Herein, the position management section 32 may specify the user closest to each of the telepresence robots 1a to 1n by comparing the image data captured by each of the telepresence robots 1a to 1n to preregistered user face image data. Additionally, the position management section 32 may also specify the user closest to each telepresence robot 1 by comparing the sound data picked up by each of the telepresence robots 1a to 1n to preregistered user voiceprints. Note that the position management section 32 may also specify the closest user by using a user database (not illustrated) associating a voiceprint and face image data with a user ID for multiple users to be managed.

For example, the position management DB 33 is configured as non-volatile memory, and is a database in which the current positions of the multiple telepresence robots 1a to 1n are registered.

Figures 3, 4:
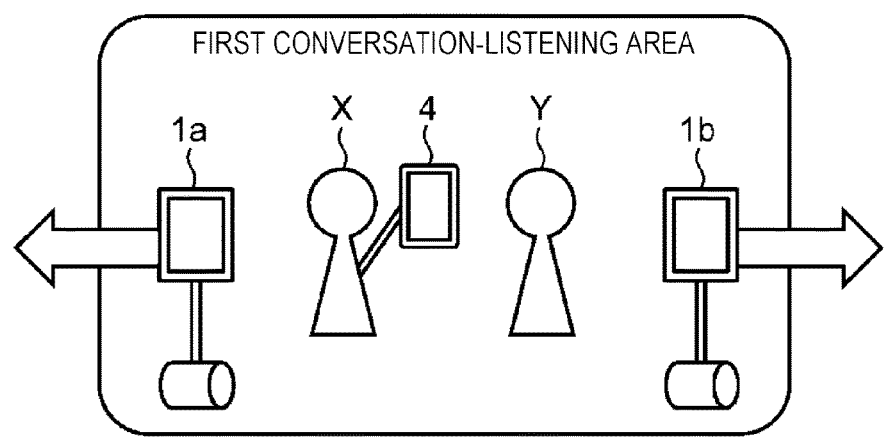
FIG. 3 is a schematic diagram illustrating an example of a usage state of the communication system according to Embodiment 1 of the present disclosure.
FIG. 4 is a diagram illustrating an example of a data configuration of a position management DB.

FIG. 4 is a diagram illustrating an example of a data configuration of the position management DB 33. For example, the position management DB 33 manages data by using a relational database in which data related to user terminals or telepresence robots to be managed is expressed as groups of multiple attribute values.

In the relational database, a group of multiple attribute values is called a record, and each of the multiple attributes is called a field. Herein, a case in which the multiple attributes included in the records are "terminal ID", "robot ID", "position", and "closest user ID" will be described as an example.

In FIG. 4, the relational database is expressed using a table. The first row indicates the contents of each of the multiple fields. The multiple fields are "terminal ID", "robot ID", "position", and "closest user ID". Herein, for the sake of simplicity, a case in which information related to the user terminal 4 and the telepresence robots 1a to 1c is registered in the position management DB 33 will be described as an example. Also, the robot IDs corresponding to information that specifies the telepresence robots 1a to 1c are assumed to be "A", "B", and "C", respectively. Also, the terminal ID corresponding to information that specifies the user terminal 4 is assumed to be "α".

Each of the second to fifth rows of FIG. 4 corresponds to one record. The records on the second to fourth rows are records related to the telepresence robots 1a to 1c, while the record on the fifth row is a record related to the user terminal 4.

In accordance with whether the apparatus to be managed is a user terminal or one of the telepresence robots 1a to 1c, a corresponding value is stored in one of "terminal ID" and "robot ID".

For example, since the record on the second row is the record of the telepresence robot 1a, "A" is stored as the value of "robot ID". Similarly, "B" and "C" are stored as the values of "robot ID" in the record for each of the telepresence robots 1b and 1c on the third and fourth rows. Note that in "terminal ID" for each of the telepresence robots 1a to 1c, "–" is stored as a value indicating that the apparatus is not registered as a user terminal.

Also, for example, since the record on the fifth row is the record of the user terminal 4, "α" is stored as the value of "terminal ID". In "robot ID" of the record of the user terminal 4, "–" is stored as a value indicating that the apparatus is not registered as a telepresence robot.

In the "position" field of each record, position information indicating the current position of the corresponding apparatus among the telepresence robots 1a to 1c and the user terminal 4 is registered. For example, in "position" of the record on the second row corresponding to the telepresence robot 1a, "Xa, Ya, Za" is stored as the value of position information indicating the current position of the telepresence robot 1a. Herein, Xa indicates latitude, Ya indicates longitude, and Za indicates altitude.

In the "closest user ID" field of the records on the second to fourth rows, the user ID of the user positioned closest to the telepresence robots 1a to 1c is registered. For example, "UA" is stored as the value of "closest user ID" of the record for the telepresence robot 1a on the second row. This indicates that the user with the user ID "UA" is closest to the telepresence robot 1a. Similarly, the value of "closest user ID" of the records on the third and fourth rows indicates that the user with the user ID "U B" is closest to the telepresence robot 1b, and the user with the user ID "UZ" is closest to the telepresence robot 1c.

In the "closest user ID" field of the records on the second to fourth rows, the user ID of a predetermined user carrying the user terminal 4 is registered. This is because the user using the user terminal 4 is considered to be closest to the user terminal 4.

Also, the user specified by the value of "closest user ID" of the record of the telepresence robot 1a when the telepresence robot 1a is in the idle state is considered to be a user who is not using the telepresence robot 1a.

Also, the user specified by the value of "closest user ID" of the record of the telepresence robot 1a when the telepresence robot 1a is in the operating state is considered to be a user who is on a call with a remote user using the telepresence robot 1a.

Note that the information registered in the "closest user ID" field is used when deciding which telepresence robot to use when a caller user calls a user in the local environment using one of the telepresence robots 1a to 1n in the local environment, for example.

Note that every time image data and sound data is transmitted from the telepresence robot 1a, the position management section 32 detects and registers the user closest to the telepresence robot 1a in the position management DB 33. Also, every time position information is transmitted from the telepresence robot 1a, the position management section 32 registers the position information in the position management DB 33. For this reason, up-to-date position information about the telepresence robot 1a is registered in the position management DB 33. The process described above is executed by the position management section 32 every time image data and sound data is transmitted from any of the telepresence robots 1b to 1n and the user terminal 4. In the above description of the position management section 32, the operation of the position management section 32 related to the telepresence robot 1a may also be reinterpreted as being related to any of the telepresence robots 1b to 1n. Thus, up-to-date position information about the telepresence robots 1a to 1n and the user terminal 4 is registered in the position management DB 33.

Also, in the case in which a private conversation request is received by the private conversation request reception section 34, the position management section 32 acquires the position of the first user.

Herein, in the case in which a private conversation request is received by the private conversation request reception section 34, it is sufficient for the position management section 32 to acquire the position information of the user terminal 4 transmitted from the user terminal 4 in association with the private conversation request as the position information of the first user.

Note that in the cloud server 3, if the position information indicating the current position of the first user who uses the user terminal 4 is managed separately from the position information of the user terminal 4, it is sufficient for the position management section 32 to acquire the managed position information as the position information of the first user. In this case, the position information of the first user may be acquired without using the position information of the user terminal 4. A mode of managing the current position information of the first user without using the user terminal 4 may be the following mode. For example, the first user is made to carry a transmitter that transmits a beacon signal. The beacon signal transmitted by the transmitter includes the user ID of the first user. Inside the building, multiple receivers that receive the beacon signal are installed at a fixed interval. When each receiver receives the beacon signal, a detection signal associating the user ID included in the beacon signal with position information about each receiver itself is transmitted to the cloud server 3. The cloud server 3 manages the position information included in the received detection signal in the position management DB 33 as the position of the first user indicated by the user ID included in the detection signal. In the case of such a configuration, when a private conversation request is received by the private conversation request reception section 34, for example, the position management section 32 acquires the managed position of the first user according to the process described above.

In addition, the position management section 32 sets a region of fixed range based on the position of the first user as the first conversation-listening area. Herein, the region of a two-dimensional circle of predetermined radius centered on the position of the first user is adopted as the first conversation-listening area, for example. The predetermined radius is a distance that satisfies conditions like the following, for example. For example, if a third party is positioned farther away than the predetermined radius from the position of the first user, the third party is unable to hear the private conversation of the first user, or is unable to understand the content of the private conversation. Additionally, for example, if a telepresence robot is positioned farther away than the predetermined radius from the position of the first user, even if the microphone 13 of the telepresence robot picks up the sound of the private conversation of the first user, the sound of the private conversation of the first user output from the speaker of a telepresence robot communicably connected to the telepresence robot is not understandable. It is sufficient for the distance of the predetermined radius to be at least the minimum value of a distance that satisfies the above conditions, for example. For example, a value such as 3 m, 4 m, or 5 m may be adopted as the distance of the predetermined radius.

In addition, based on the position management DB 33, the position management section 32 detects the telepresence robot positioned inside the first conversation-listening area based on the position of the first user as a first evacuation communication apparatus. Note that in the case in which multiple telepresence robots are positioned inside the first conversation-listening area, the position management section 32 detects each of the multiple telepresence robots as the first evacuation communication apparatus. Herein, it is sufficient for the position management section 32 to detect the telepresence robot 1 positioned inside the set first conversation-listening area as the first evacuation communication apparatus by using the current position of the telepresence robot registered in the "position" field of the position management DB 33.

The position management section 32 outputs information about the telepresence robot detected as the first evacuation communication apparatus to the robot position control section 35. The information about the telepresence robot output by the position management section 32 to the robot position control section 35 refers to the robot ID of the telepresence robot, for example.

An example of the process by which the position management section 32 detects the first evacuation communication apparatus will be described hereinafter for the case in which the position management DB 33 manages a table as illustrated in FIG. 4, for example.

The position management section 32 receives, via the communication section 31, a private conversation request and a terminal ID transmitted from the user terminal 4 used by the first user.

The position management section 32 references the table illustrated in FIG. 4 which is managed by the position management DB 33, and acquires the "position" value related to the terminal ID of the user terminal 4 as a value indicating the current position of the first user. In this case, since the terminal ID of the user terminal 4 is "α" as described earlier, "Xα, Yα, Zα" is acquired as the value indicating the current position of the first user.

The position management section 32 calculates the region of a two-dimensional circle of predetermined radius centered on "Xα, Yα", and sets this region as the first conversation-listening area.

The position management section 32 acquires the current position of each of the telepresence robots 1a to 1c, and determines whether or not the acquired current position of each of the telepresence robots 1a to 1c is included inside the first conversation-listening area. If there is a telepresence robot whose current position is included inside the first conversation-listening area, the telepresence robot is detected as the first evacuation communication apparatus. The position management section 32 outputs the robot ID of the telepresence robot detected as the first evacuation communication apparatus to the robot position control section 35.

Note that in the above example, the region of a two-dimensional circle of predetermined radius centered on "Xα, Yα" is set as the first conversation-listening area, but the first conversation-listening area is not limited thereto. For example, in addition to the region of a two-dimensional circle, the altitude "Zα" additionally may be used to specify the first conversation-listening area. For example, a fixed range with respect to "Zα" may be set as the first conversation-listening area. The fixed range may be the height of the space where the first user is present, for example. With this arrangement, a columnar region is set as the first conversation-listening area.

In this case, if there is a telepresence robot whose current position is included inside the columnar region set as the first conversation-listening area, the telepresence robot is detected as the first evacuation communication apparatus.

As the fixed range of the height, a value (for example, 2 m or 3 m) by which one is anticipated to be on the same floor as the first user may be adopted, for example.

The private conversation request reception section 34 receives the private conversation request that requests a private conversation. The private conversation request is input by the first user using the user terminal 4, for example. The input private conversation request is transmitted from the user terminal 4 to the cloud server 3. The communication section 31 of the cloud server 3 receives and outputs the private conversation request to the private conversation request reception section 34. The private conversation request reception section 34 receives the private conversation request, determines that the private conversation request has been input by the first user, and accepts the private conversation request.

Additionally, the private conversation request reception section 34 may also determine that the private conversation request has been input by the first user who uses the user terminal 4 when the communication section 31 receives the private conversation request transmitted from the user terminal 4, and accept the private conversation request. Additionally, when the private conversation is accepted, the private conversation request reception section 34 may also output information indicating that the private conversation request has been accepted to the position management section 32. In this case, when the information is received, the position management section 32 may execute the processes described earlier, such as acquiring the position of the first user, setting the first conversation-listening area, and detecting the first evacuation communication apparatus.

The robot position control section 35 outputs, to the communication section 31, an evacuation order that causes the telepresence robot detected as the first evacuation communication apparatus to evacuate from the first conversation-listening area. The communication section 31 transmits to the evacuation order to the telepresence robot detected as the first evacuation communication apparatus. In the following description, the telepresence robot detected as the first evacuation communication apparatus will be described as the first evacuation communication apparatus.

Herein, when the robot position control section 35 outputs the evacuation order to the first evacuation communication apparatus, thereafter, every time position information is received from the first evacuation communication apparatus, the robot position control section 35 determines whether or not the position indicated by the position information of the first evacuation communication apparatus is outside of the first conversation-listening area. Alternatively, the robot position control section 35 may monitor the position of the first evacuation communication apparatus in the position management DB 33, and determine whether or not the position of the first evacuation communication apparatus is outside the first conversation-listening area.

With this arrangement, the robot position control section 35 is able to monitor the current position of the first evacuation communication apparatus. Note that the above determination may also be executed by the position management section 32.

When it is determined that the position of the first evacuation communication apparatus is outside of the first conversation-listening area, it is sufficient for the robot position control section 35 to output a stop order to the first evacuation communication apparatus and cause the first evacuation communication apparatus to stop. Thereafter, the first evacuation communication apparatus evacuated from the first conversation-listening area moves autonomously as appropriate. At this time, if the robot position control section 35 detects that first evacuation communication apparatus has once again entered the first conversation-listening area, or has entered a proximity region surrounding the first conversation-listening area, the robot position control section 35 outputs an evacuation order to the first evacuation communication apparatus.

Also, if a telepresence robot other than the first evacuation communication apparatus newly enters the first conversation-listening area while the first conversation-listening area is set, there is a risk that the user using the telepresence robot may listen to the private conversation. Accordingly, while the first conversation-listening area is set, the robot position control section 35 monitors the position information transmitted periodically from not only the first evacuation communication apparatus, but also the other telepresence robots, and in the case in which a telepresence robot enters the first conversation-listening area, the robot position control section 35 transmits an evacuation order to the corresponding telepresence robot, thereby causing the telepresence robot to evacuate to the outside of the first conversation-listening area. In this case, if a telepresence robot 1 other than the first evacuation communication apparatus enters the first conversation-listening area, it is sufficient to transmit an evacuation order to the corresponding telepresence robot and cause the telepresence robot to evacuate to the outside of the first conversation-listening area, similarly to the first evacuation communication apparatus.

Additionally, while the first conversation-listening area is set, the robot position control section 35 may also detect the first evacuation communication apparatus or a telepresence robot other than the first evacuation communication apparatus moving in a direction approaching the first conversation-listening area. In this case, the robot position control section 35 may transmit a stop signal to the corresponding first evacuation communication apparatus or telepresence robot other than the first evacuation communication apparatus. With this arrangement, while the first conversation-listening area is set, entry into the first conversation-listening area by the first evacuation communication apparatus or a telepresence robot other than the first evacuation communication apparatus may be preemptively deterred.

The touch panel 41 of the user terminal 4 displays various messages to the first user, and receives operations performed by the first user. The touch panel 41 displays an image that includes a private conversation request button by which the first user inputs a private conversation request. When the pressing of the private conversation request button is detected by the touch panel 41, the private conversation request acquisition section 42 acquires the private conversation request input by the first user.

The communication section 43 is configured as a communication module that connects the user terminal 4 to the network NT. The communication section 43 transmits the private conversation request acquired by the private conversation request acquisition section 42 to the cloud server 3. Herein, it is sufficient for the communication section 43 to associate the private conversation request with position information about the user terminal 4 and the terminal ID of the user terminal 4, and transmit this information to the cloud server 3.

The position information acquisition section 44 acquires position information about the user terminal 4, based on a beacon signal received by the antenna 45. The beacon signal is the beacon signal transmitted periodically from the transmitter described earlier. In this case, the position information acquisition section 44 may acquire the position information of a transmitter included in the beacon signal as one's own position information, or acquire position information computed by using the principle of triangulation from the position information included in beacon signals from three points as one's own position information.

The antenna 45 is configured as an antenna conforming to the BLE standard, for example, and receives beacon signals.

FIG. 3 is a schematic diagram illustrating an example of a usage state of the communication system according to Embodiment 1 of the present disclosure. In FIG. 3, it is supposed that a first user "X" and a user "Y" different from the first user are present in a space inside an office corresponding to the local environment, and in addition, telepresence robots 1a and 1b are placed in the local environment, for example. FIG. 3 illustrates a scene in which the first user "X" and the user "Y" are engaged in a face-to-face private conversation inside the office, for example. Before initiating the private conversation, the first user "X" presses a private conversation input button displayed on the touch panel 41 of one's own user terminal 4. The private conversation input button refers to a button that, when pressed via the touch panel 41, outputs a private conversation request that requests a private conversation. The private conversation request acquisition section 42 outputs the private conversation request to the communication section 43. The communication section 43 receives the private conversation request, causes the position information acquisition section 44 to acquire one's own position information, and treats the acquired position information as position information indicating the current position of the user terminal 4. The position information is also position information indicating the position of the first user when the private conversation request was input into the user terminal 4. The communication section 43 associates the private conversation request with the position information and the terminal ID of the user terminal 4, and transmits this information to the cloud server 3.

When the communication section 31 of the cloud server 3 receives the private conversation request from the user terminal 4, the private conversation request reception section 34 accepts the private conversation request. The position management section 32 registers the value indicated by the position information of the user terminal 4 associated with the private conversation request in the position management DB 33 as the current position of the user terminal 4.

In addition, the position management section 32 sets a region of fixed range based on the received position of the user terminal 4 as the first conversation-listening area.

The position of the user terminal 4 is acquired as the position of the first user "X" who uses the user terminal 4. Consequently, the first conversation-listening area is set centered on the acquired first user "X". Additionally, the position management section 32 references the position management DB 33, and for each of the telepresence robots 1*a* and 1*b*, determines whether or not the current position is inside the first conversation-listening area. A telepresence robot whose current position is determined to be inside the first conversation-listening area is detected as the first evacuation communication apparatus. For example, suppose that the telepresence robots 1*a* and 1*b* are detected as first evacuation communication apparatus. In this case, the position management section 32 outputs the robot ID of each of the telepresence robots 1*a* and 1*b* detected as the first evacuation communication apparatus to the robot position control section 35. the robot position control section 35 specifies the telepresence robots detected as the first evacuation communication apparatus based on the robot IDs received from the position management section 32. In the above example, the robot position control section 35 receives the robot IDs of the telepresence robots 1*a* and 1*b* from the position management section 32, and thus specifies that the first evacuation communication apparatus are the telepresence robots 1*a* and 1*b*. The robot position control section 35 associates an evacuation order with the robot ID of each of the specified telepresence robots 1*a* and 1*b*, and transmits this information to each of the telepresence robots 1*a* and 1*b*.

Note that the robot position control section 35 may also transmit the evacuation order to all telepresence robots managed by the position management DB 33. The telepresence robot corresponding to a robot ID that matches a robot ID received together with the evacuation order may be configured to judge that itself is the first evacuation communication apparatus, and evacuate to the outside of the first conversation-listening area.

Each of the telepresence robots 1*a* and 1*b* receiving the evacuation order moves autonomously in a direction going away from the current position while also avoiding obstacles, for example. Additionally, when the telepresence robots 1*a* and 1*b* exit the first conversation-listening area, a stop order is transmitted from the cloud server 3, and the telepresence robots 1*a* and 1*b* stop. With this arrangement, the telepresence robots 1*a* and 1*b* are evacuated to the outside of the first conversation-listening area. Thereafter, if the telepresence robots 1*a* and 1*b* attempt to enter the first conversation-listening area, an evacuation order is transmitted, and entry into the first conversation-listening area is prohibited. For this reason, a situation does not occur in which a different user "Z" not involved in the private conversation uses the telepresence robot 1*a* or 1*b* inside the first conversation-listening area to call a remote user "W". As a result, it is possible to avoid the private conversation between the first user "X" and the user "Y" being listened to directly by the user "Z", or being listened to by the user "W" in a remote location via the telepresence robot 1*a* or 1*b*.

On the other hand, since the user "Z" inside the first space is able to call the user "W" using one of the telepresence robots 1*a* and 1*b* outside of the first conversation-listening area, the telepresence robots 1*a* and 1*b* do not have to be pet into an unavailable state to deter the user "Z" and the user "W" from listening to the private conversation between the first user "X" and the user "Y". With this arrangement, the utilization efficiency of the telepresence robots 1*a* and 1*b* may be increased. Also, if the telepresence robots 1*a* and 1*b* are put into an unavailable state, a user not involved in the private conversation will notice, by the unavailable state, that a private conversation is currently occurring. However, since the present disclosure does not put the telepresence robots 1*a* and 1*b* into an unavailable state, a user not involved in the private conversation may be deterred from noticing that a private conversation is currently occurring.

Note that when evacuating the telepresence robots 1*a* and 1*b* from the first conversation-listening area, if the cloud server 3 causes the telepresence robots 1*a* and 1*b* to stop on the outer periphery or on the boundary line of the first conversation-listening area, the telepresence robots will be lined up on the outer periphery, and there is a possibility of causing a user not involved in the private conversation to feel uncomfortable or notice that a private conversation is occurring. The above is particularly noticeable in the case in which a large number of telepresence robots exist inside the first conversation-listening area and are evacuated to the outside of the first conversation-listening area. Accordingly, in the case in which there are multiple telepresence robots to be evacuated from the first conversation-listening area, the cloud server 3 may cause the multiple telepresence robots to stop after being evacuated to the outside of the first conversation-listening area, so that there is variation in the distances from the stopped position of each of the multiple telepresence robots made to stop on the outside of the first conversation-listening area to the position of the first user.

For example, in the case in which there are multiple telepresence robots to be evacuated to the outside of the first conversation-listening area, the robot position control section 35 may cause the time intervals between the determination that a telepresence robot is on the outside of the first conversation-listening area and the transmission of the stop order to be different time intervals.

Figure 5:
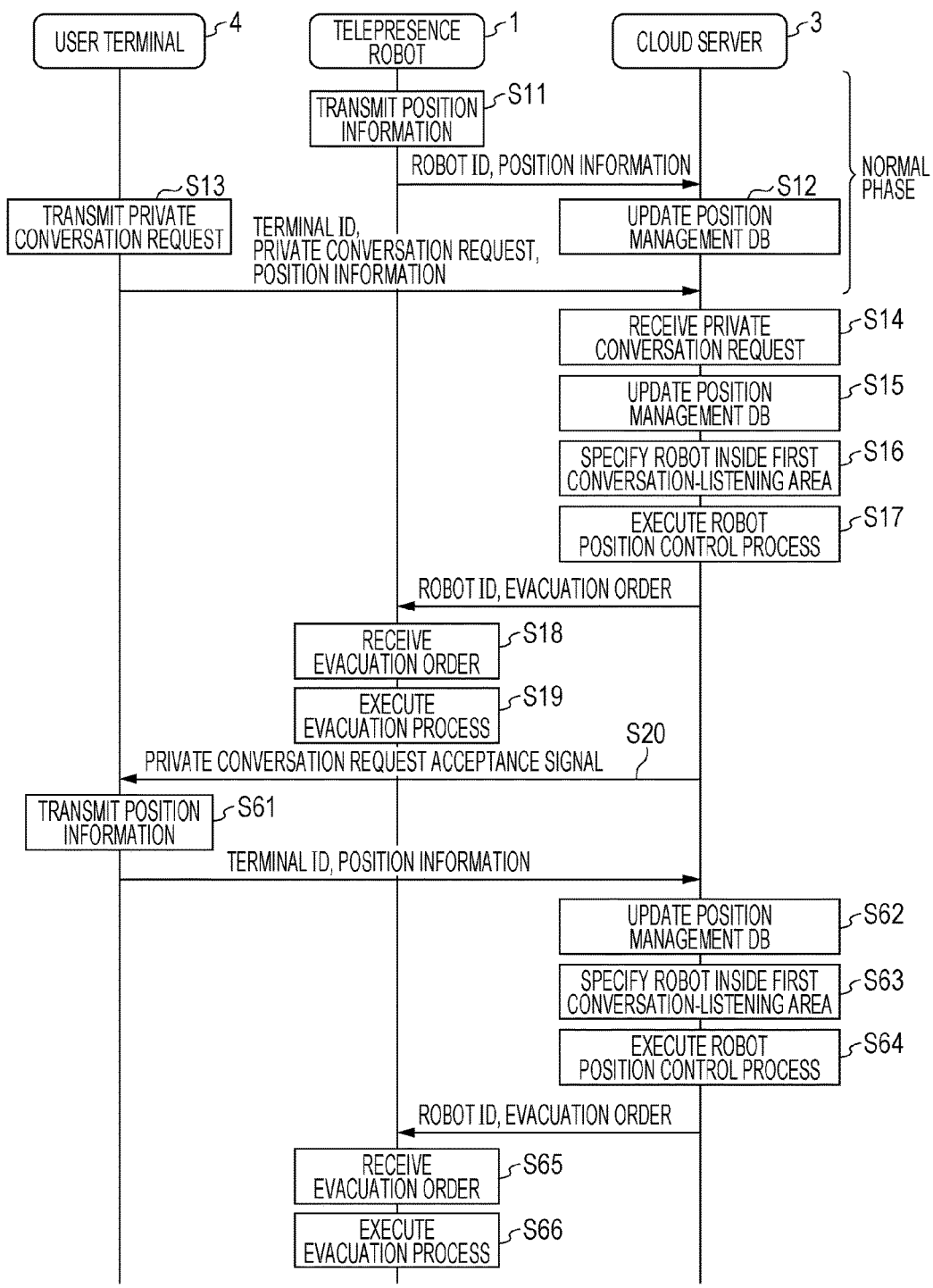
FIG. 5 is a sequence diagram illustrating an example of a process for setting the first conversation-listening area in the communication system according to Embodiment 1 of the present disclosure.

FIG. 5 is a sequence diagram illustrating an example of a process for setting the first conversation-listening area in the communication system according to Embodiment 1 of the present disclosure. Herein, for the sake of simplicity, the telepresence robot to be evacuated to the outside of the first conversation-listening area will be described as the telepresence robot 1.

The processes in S11 and S12 constitute a normal phase which is carried out continuously in the communication system. In S11, the communication section 17 of the telepresence robot 1 associates position information including a value indicating the current position of the telepresence robot 1 acquired by the position information acquisition section 16 with the robot ID, and transmits this information to the cloud server 3.

In S12, the communication section 31 of the cloud server 3 receives the position information and the robot ID of the telepresence robot 1 transmitted from the telepresence robot 1. Additionally, the position management section 32 of the cloud server 3 updates the "position" value of the record corresponding to the robot ID of the telepresence robot 1 registered in the position management DB 33 to the value indicated by the received position information.

Herein, since the telepresence robot 1 transmits position information periodically, up-to-date position information about the telepresence robot 1 is registered in the position management DB 33. Note that in the normal phase, the position management section 32 of the cloud server 3 also executes a process of detecting the user closest to the telepresence robot 1 by using image data and sound data transmitted periodically from the telepresence robot 1, and registering the closest user in the position management DB 33.

On the other hand, if a private conversation request is input by the first user on the user terminal 4, the processes from S13 are initiated. In S13, the private conversation request acquisition section 42 of the user terminal 4 acquires the private conversation request input by the first user operating the touch panel 41, and outputs to the communication section 43. Additionally, in S13, the communication section 43 of the user terminal 4 receives the private conversation request, and acquires position information about the user terminal 4 from the position information acquisition section 44. The acquired position information indicates the current position of the user terminal 4. The communication section 43 of the user terminal 4 associates the private conversation request with the position information about the user terminal 4 and the terminal ID of the user terminal 4, and transmits this information to the cloud server 3.

In S14, the communication section 31 of the cloud server 3 receives and outputs the private conversation request to the private conversation request reception section 34, and the private conversation request reception section 34 receives and accepts the private conversation request from the communication section 31.

In S15, the position management section 32 updates the value of the field corresponding to "position" in the record for the user terminal 4 from among the records in the position management DB 33 to the value indicated by the position information about the user terminal 4 associated with the private conversation request received in S14.

In S16, the position management section 32 acquires the position information about the user terminal 4 associated with the private conversation request received in S14 as position information indicating the current position of the first user, and sets a region of fixed range based on the acquired position of the first user as the first conversation-listening area. Herein, the first conversation-listening area is taken to be the region of a circle of predetermined radius centered on the acquired position of the first user. Also, in S16, the position management section 32 references the position management DB 33, and if there is a telepresence robot for which a position inside the first conversation-listening area is registered as the current position, the telepresence robot is detected as the first evacuation communication apparatus. The sequence diagram illustrated in FIG. 5 indicates a case in which the telepresence robot 1 is detected as the first evacuation communication apparatus. The position management section 32 outputs the robot ID of the telepresence robot 1 to the robot position control section 35.

In S17, the robot position control section 35 executes a robot position control process that causes the telepresence robot 1 detected as the first evacuation communication apparatus to evacuate from the first conversation-listening area.

Specifically, in S17, the robot position control section 35 generates an evacuation order causing the telepresence robot 1 detected as the first evacuation communication apparatus to evacuate to the outside of the first conversation-listening area. The robot position control section 35 specifies the telepresence robot 1 to which to transmit the evacuation order based on the robot ID received from the position management section 32. The robot position control section 35 associates the generated evacuation order with the robot ID of the telepresence robot 1, and uses the communication section 31 to transmit this information to the telepresence robot 1. After transmitting the evacuation order, the robot position control section 35 determines whether or not the telepresence robot 1 is inside the first conversation-listening area, based on position information about the telepresence robot 1 transmitted periodically from the telepresence robot 1. In the case determining that the telepresence robot 1 is not inside the first conversation-listening area, or in other words that the telepresence robot 1 is on the outside of the first conversation-listening area, the robot position control section 35 generates a stop order causing the telepresence robot 1 to stop. The robot position control section 35 associates the generated stop order with the robot ID of the telepresence robot 1, and uses the communication section 31 to transmit this information to the telepresence robot 1.

By transmitting the evacuation order, the cloud server 3 causes the telepresence robot 1 detected as the first evacuation communication apparatus to evacuate to the outside of the first conversation-listening area.

In S18, the communication section 17 of the telepresence robot 1 corresponding to the first evacuation communication apparatus receives the evacuation order. In S19, the driving control section 18 of the corresponding telepresence robot 1 executes an evacuation process that evacuates the telepresence robot 1 from the first conversation-listening area. Herein, the driving control section 18 of the corresponding telepresence robot 1 controls the motor 19, and executes the evacuation process by causing itself to move autonomously in a direction going away from the current position. Note that if the stop order is received from the cloud server 3 through the communication section 17 of the telepresence robot 1, the driving control section 18 of the telepresence robot 1 ends the evacuation process.

After determining that the telepresence robot 1 is outside the first conversation-listening area, the robot position control section 35 outputs a signal indicating that the first evacuation communication apparatus does not exist in the first conversation-listening area to the private conversation request reception section 34.

In S20, the private conversation request reception section 34 of the cloud server 3 uses the communication section 31 to transmit, to the user terminal 4, a private conversation request acceptance signal indicating that the private conversation request has been accepted. With this arrangement, the user terminal 4 is able to display a message indicating that the private conversation request has been accepted on a display, or output the message from a speaker as sound, and the acceptance of the private conversation request is recognized by the first user. The first user may initiate the private conversation after recognizing the above message, for example.

When the private conversation request acceptance signal is received, the communication section 43 of the user terminal 4 causes the position information acquisition section 44 to acquire position information periodically. Every time position information is acquired by the position information acquisition section 44, the communication section 43 associates the position information with the terminal ID of the user terminal 4, and transmits this information to the cloud server 3. This is because the first user conceivably may move while holding the user terminal 4.

S61 to S66 indicate processes when the first user moves while holding the user terminal 4. At this time, the region of fixed range based on the position of the first user, that is, the first conversation-listening area, is updated according to the movement of the first user. Also, the telepresence robot 1 inside the updated first conversation-listening area is evacuated from the first conversation-listening area.

In S61, the communication section 43 of the user terminal 4 transmits new current position information about the user terminal 4 acquired by the position information acquisition section 44, and the terminal ID of the user terminal 4, to the cloud server 3 on a fixed time interval.

Since S62 is a process similar to S12, a description is omitted.

In S63, the position management section 32 acquires the new position information about the user terminal 4 received in S62 as position information about the first user, and newly sets the first conversation-listening area centered on the acquired position of the first user. Also, in S32, the position management section 32 references the position management DB 33, and if there is a telepresence robot positioned inside the new first conversation-listening area, the telepresence robot is detected as the first evacuation communication apparatus. The example illustrated in FIG. 5 indicates a case in which the telepresence robot 1 is detected as the first evacuation communication apparatus. Note that in S63, if there is no telepresence robot positioned inside the new first conversation-listening area, the processes from S63 to S66 are not executed. When new position information about the user terminal 4 is transmitted from the user terminal 4 after a fixed time, the processes from S62 are executed.

Since the processes from S64 to S66 are similar to the processes from S19 to S19, a description is omitted.

Figure 6:
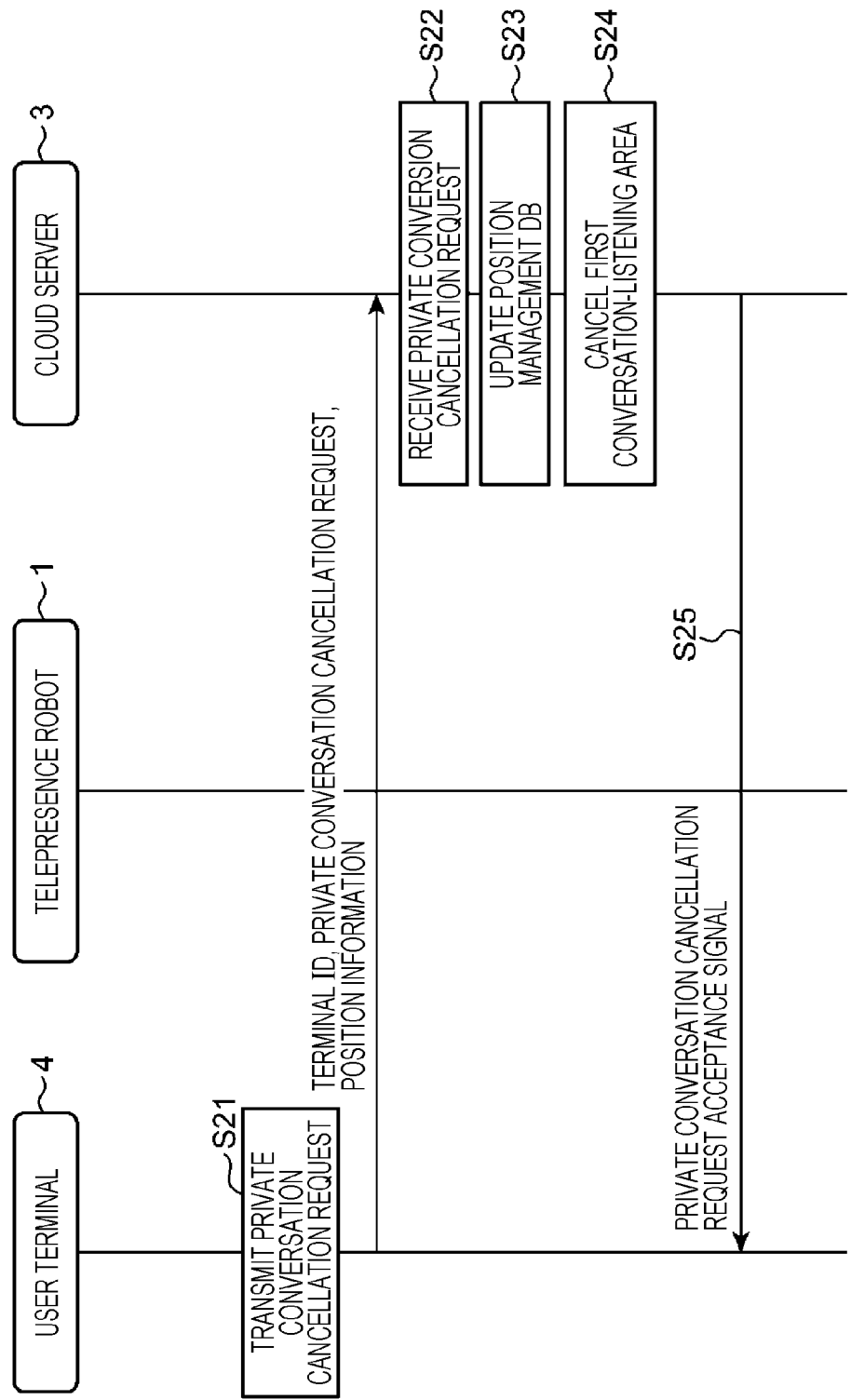
FIG. 6 is a sequence diagram illustrating an example of a process for canceling the setting of the first conversation-listening area in the communication system according to Embodiment 1 of the present disclosure.

FIG. 6 is a sequence diagram illustrating an example of a process for canceling the setting of the first conversation-listening area in the communication system according to Embodiment 1 of the present disclosure.

In S21, if a private conversation cancellation request that requests a cancellation of the private conversation request is input into the user terminal 4 by the first user, the private conversation request acquisition section 42 acquires the private conversation cancellation request, and outputs to the communication section 43. The communication section 43 treats the position of the user terminal 4 indicated by position information about the user terminal 4 acquired by the position management section 32 immediately before or immediately after acquiring the private conversation cancellation request as the current position of the user terminal 4. The communication section 43 associates the private conversation cancellation request with the terminal ID of the user terminal 4 and the position information about the user terminal 4, and transmits this information to the cloud server 3.

In S22, in the cloud server 3, when the communication section 31 receives the private conversation cancellation request from the user terminal 4, the communication section 31 outputs to the private conversation request reception section 34, and the private conversation request reception section 34 receives and accepts the private conversation cancellation request from the communication section 31. Alternatively, the private conversation request reception section 34 may accept the private conversation cancellation request when the communication section 31 receives the private conversation cancellation request. The private conversation request reception section 34 may also output information indicating that the private conversation cancellation request has been accepted to the position management section 32.

In S23, the position management section 32 registers the value indicated by the position information associated with the private conversation cancellation request in S22 in "position" of the record for the user terminal 4 in the position management DB 33. With this arrangement, the position information about the user terminal 4 is updated.

In S24, the cloud server 32 cancels the setting of the first conversation-listening area corresponding to the private conversation cancellation request received in S22.

In S25, the communication section 31 of the cloud server 3 transmits a private conversation cancellation request acceptance signal to the user terminal 4. With this arrangement, a message indicating that the private conversation request has been canceled is displayed on the user terminal 4, and the cancellation of the private conversation request is recognized by the first user.

Note that in the case in which the private conversation request is canceled, the cloud server 3 does not transmit an evacuation order even if the telepresence robot 1 attempts to enter the first conversation-listening area. With this arrangement, after the setting of the first conversation-listening area is canceled, the telepresence robot 1 is able to enter the region that had been set as the first conversation-listening area.

In this way, according to the communication system according to Embodiment 1 of the present disclosure, when the first user inputs a private conversation request into the user terminal 4, a region of fixed range based on the position of the first user is set as the first conversation-listening area, and the telepresence robot 1 inside the first conversation-listening area moves to the outside of the first conversation-listening area. With this arrangement, the telepresence robot 1 is no longer close enough for the private conversation of the first user to be audible, and a user not involved in the private conversation no longer enters the first conversation-listening area by using the telepresence robot. For this reason, a user not involved in the private conversation may be deterred from listening to the private conversation, even without putting the telepresence robot 1 into an unavailable state. Also, since the present embodiment does not put the telepresence robot 1 into an unavailable state, a user not involved in the private conversation may be deterred from noticing that the private conversation is occurring.

In addition, while the first conversation-listening area is set, the entry into the first conversation-listening area by all telepresence robots 1 not involved in the private conversation inside the first conversation-listening area is prohibited. For this reason, the present embodiment is able to deter entry into the first conversation-listening area by a user not involved in the private conversation due to using the telepresence robot 1 while the first conversation-listening area is set. For this reason, the present disclosure is able to deter such a user from listening to the private conversation.

Embodiment 2

The communication system according to Embodiment 2 anticipates a case in which a private conversation request is input in a state in which a communication connection has been established between telepresence robots. Note that in the present embodiment, structural elements that are the same as Embodiment 1 are denoted with the same signs, and description thereof is omitted.

Figure 7:
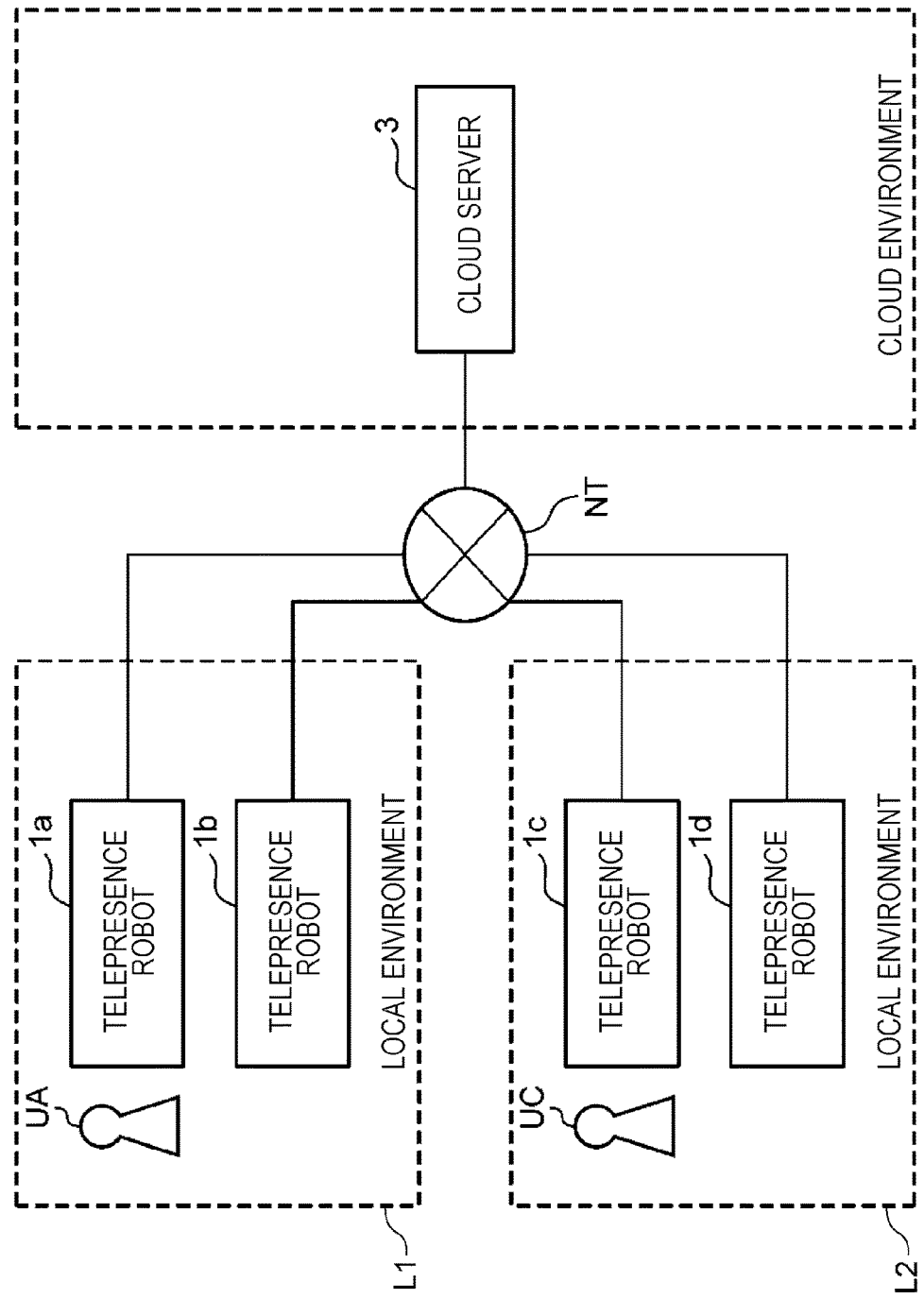
FIG. 7 is a diagram illustrating an example of an overall configuration of a communication system according to Embodiment 2 of the present disclosure.

FIG. 7 is a diagram illustrating an example of an overall configuration of the communication system according to Embodiment 2 of the present disclosure. FIG. 7 differs from FIG. 1 in that two local environments L1 and L2 are illustrated. The local environment L1 is the first space in which the telepresence robots 1*a* and 1*b* are placed, for example, and a user UA is assumed to be present inside the space. Since the first space has been described in an embodiment, a detailed description is omitted. In the present embodiment, the telepresence robot 1 is used as a first communication apparatus used by the first user. The telepresence robot 1*a* is an example of the first communication apparatus. Also, the local environment L2 is the second space corresponding to the space in which the telepresence robots 1*c* and 1*d* are placed. The second space is a separate space from the first space, and a user UC is assumed to be present in this space. Also, each of the telepresence robots 1*c* and 1*d* is an example of the third communication apparatus.

The telepresence robots 1*a* to 1*d* and the cloud server 3 are communicably connected to each other via the network NT.

In FIG. 7, for example, suppose that a communication connection has been established between the telepresence robot 1*a* and the telepresence robot 1*c* (an example of the third communication apparatus), and that the user UA (an example of the first user) and the user UC (an example of the second user) are having a conversation through the telepresence robots 1*a* and 1*c*. Note that the telepresence robot 1*c* may or may not have a communication connection established with the telepresence robot 1*b*.

For example, suppose that the user UA and the user UC want to have a private conversation through the telepresence robots 1*a* and 1*c*. In this case, if the telepresence robot 1*b* is present near the user UA, the microphone 13 of the telepresence robot 1*b* will pick up the voice of the user UA, or the voice of the user UC will be output from the speaker of the telepresence robot 1*a*.

In this case, there is a risk that the voice of the user UA or the user UC will be output from the speaker 23 of the telepresence robot 1*d* having an established communication connection with the telepresence robot 1*b*, and the private conversation will be heard by a third party different from the user UC inside the local environment L2.

This may be considered similar to the case in which the telepresence robot 1*d* is present near the user UC.

In Embodiment 2, in this situation, a third party not involved in the private conversation between the user UA and the user UC may be deterred from listening to the private conversation.

Figure 8:
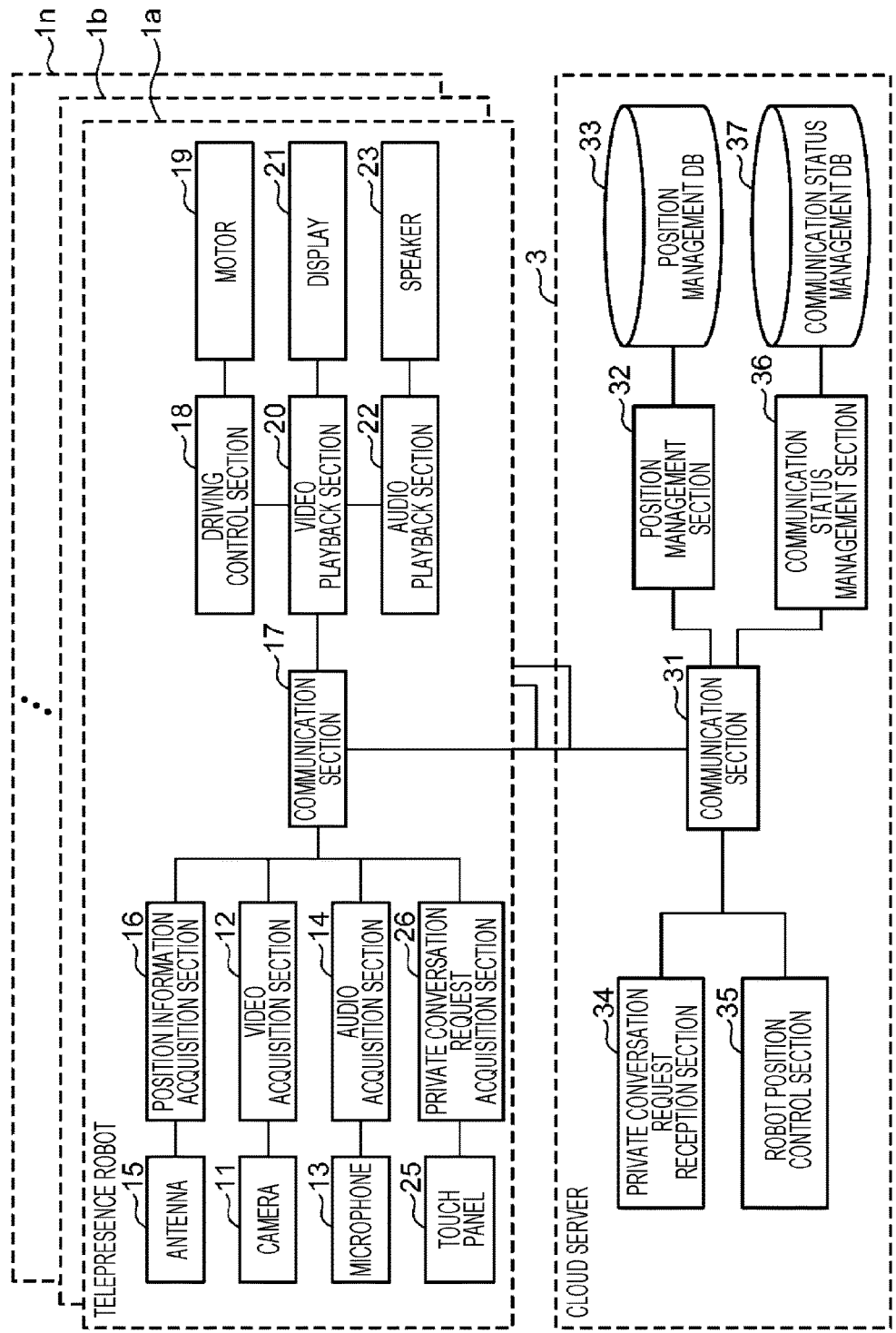
FIG. 8 is a block diagram illustrating a detailed configuration of the communication system illustrated in FIG. 7.

FIG. 8 is a block diagram illustrating a detailed configuration of the communication system illustrated in FIG. 7. FIG. 8 differs from FIG. 2 in that a touch panel 25 and a private conversation request acquisition section 26 are added to the telepresence robot 1, the user terminal 4 is omitted, and a communication status management section 36 and a communication status management DB 37 are added to the cloud server 3.

Since the touch panel 25 and the private conversation request acquisition section 26 are the same as the touch panel 41 and the private conversation request acquisition section 42 of the user terminal 4 in FIG. 2, a description is omitted.

In FIG. 8, the omission of the user terminal 4 is because Embodiment 2 anticipates that the first user will use the telepresence robot 1 to initiate a private conversation with the second user in a remote location.

The communication status management section 36 manages the communication status management DB 37 that indicates, for all telepresence robots being managed, which telepresence robot is currently connected in an established communication connection.

Figures 9, 10:
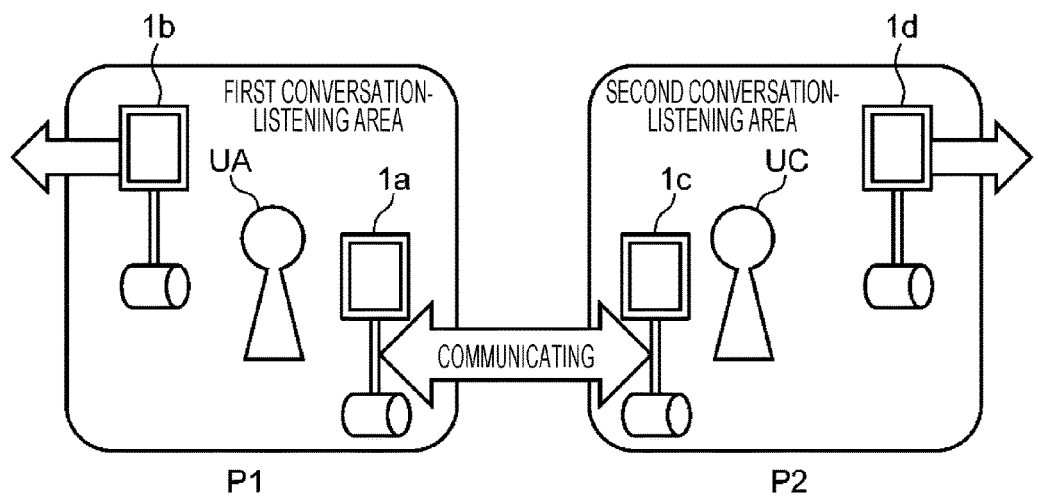
FIG. 9 is a schematic diagram illustrating an example of a usage state of the communication system according to Embodiment 2 of the present disclosure.
FIG. 10 is a diagram illustrating an example of a data configuration of a communication status management DB.

FIG. 10 is a diagram illustrating an example of the data configuration of the communication status management DB 37. For example, the communication status management DB 37 manages data by using a relational database in which data related to user terminals or telepresence robots to be managed is expressed as groups of multiple attribute values.

A case in which the multiple attributes included in the records are "robot ID", "communication status", and "callee" will be described as an example.

In FIG. 10, the relational database is expressed using a table. The first row indicates the contents of each of the multiple fields, that is, the multiple attributes. Each of the second to fourth rows of FIG. 10 corresponds to one record. The records on the second to fourth rows are records related to the telepresence robots 1*a* to 1*c*. Since "robot ID" has been described in Embodiment 1, a description is omitted herein. In "communication status", information indicating whether the corresponding telepresence robot is in an idle status or an established communication connection status is registered. For example, in the case in which the telepresence robot 1*b* with the robot ID "B" is in an idle status, in "communication status" of the record for the telepresence robot 1*b*, "idle" indicating the idle status is registered. Also, suppose that the telepresence robot 1*a* with the robot ID "A" and the telepresence robot 1*c* with the robot ID "C" have an established communication connection with each other. In this case, in "communication status" of the record for each of the telepresence robots 1*a* and 1*c*, "communicating" indicating that a communication connection has been established is registered.

In the "callee" field, the robot ID of the telepresence robot 1 with which a communication connection is established with respect to the telepresence robot 1 is registered. In the example of FIG. 10, since a communication connection is established between the telepresence robot 1*a* with the robot ID "A" and the telepresence robot 1*c* with the robot ID "C", in the record for the telepresence robot 1*a*, "C" indicating the robot ID of the telepresence robot 1*c* which is the callee of the telepresence robot 1*a* is registered in "callee". Also, in the record for the telepresence robot 1*c*, "A" indicating the robot ID of the telepresence robot 1*a* which is the callee of the telepresence robot 1*c* is registered in "callee".

The communication connection between the telepresence robot 1*a* and the telepresence robot 1*c* is established by following the procedure below, for example. First, the user UA inputs into the telepresence robot 1*a* a conversation request specifying the user UC as the other party. Subsequently, the input information is received by the cloud server 3, and the position management section 32 references the position management DB 33 (FIG. 4), and searches for the telepresence robot closest to the user UC. Herein, assume that the telepresence robot 1c is returned by the search. Next, the communication section 31 notifies the telepresence robot 1c that there is a conversation request from the user UA. Next, the telepresence robot 1c outputs a message indicating that there is a conversation request from the user UA, and queries the user UC whether or not to agree to the conversation request. Subsequently, if the user UC inputs an intent to agree to the conversation request into the telepresence robot 1c, the information is received by the cloud server 3. Subsequently, the communication status management section 36 establishes a communication connection between the telepresence robot 1a and the telepresence robot 1c, and registers, in the communication status management DB 37, information indicating that a communication connection has been established between the telepresence robot 1a and the telepresence robot 1c.

The description will now reference FIG. 8 again. In the case in which a private conversation request by the user UA is received from the communication section 31 while in the state of an established communication connection between the telepresence robot 1a and the telepresence robot 1c, the private conversation request reception section 34 accepts the private conversation request.

In the case in which the private conversation request is accepted by the private conversation request reception section 34, it is sufficient for the position management section 32 to reference the position management DB 33, acquire position information about the telepresence robots 1a and 1c, and acquire the acquired position information as position information about the users UA and UC.

Also, the position management section 32 sets a region of fixed range based on the position of the user UA as the first conversation-listening area, and also sets a region of fixed range based on the position of the user UC as the second conversation-listening area. Herein, the first conversation-listening area is taken to be the region of a circle of predetermined radius centered on the acquired position of the user UA who corresponds to the first user. Herein, the second conversation-listening area is taken to be the region of a circle of predetermined radius centered on the position of the user UC who corresponds to the second user. At this point, assume that the predetermined radius of the circular region set as the first conversation-listening area and the predetermined radius of the circular region set as the second conversation-listening area are the same. Thus, the second conversation-listening area is the same size as the first conversation-listening area.

In addition, the position management section 32 references the position management DB 33 and detects a telepresence robot other than the telepresence robot 1a used by the user UA positioned inside the first conversation-listening area as the first evacuation communication apparatus, and also detects a telepresence robot other than the telepresence robot 1c used by the user UC positioned inside the second conversation-listening area as the second evacuation communication apparatus. Note that since the details of the detection of the second evacuation communication apparatus are similar to the detection of the first evacuation communication apparatus described in Embodiment 1, a detailed description is omitted herein.

The robot position control section 35 generates an evacuation order causing the first evacuation communication apparatus to evacuate to the outside of the first conversation-listening area, associates the evacuation order with the robot ID of the first evacuation communication apparatus, and uses the communication section 31 to transmit this information to the telepresence robot 1b. In addition, the robot position control section 35 generates an evacuation order causing the second evacuation communication apparatus to evacuate to the outside of the second conversation-listening area, associates the evacuation order with the robot ID of the second evacuation communication apparatus, and uses the communication section 31 to transmit this information to the telepresence robot 1d.

Note that likewise for the second conversation-listening area, similarly to the first conversation, in the case in which a telepresence robot not involved in the private conversation enters the second conversation-listening area while the second conversation-listening area is set, the robot position control section 35 transmits an evacuation order causing the telepresence robot to evacuate to the outside of the second conversation-listening area, and causes the telepresence robot to evacuate to the outside of the second conversation-listening area.

In addition, likewise for the second conversation-listening area, similarly to the first conversation-listening area, if a telepresence robot not involved in the private conversation is present inside the second conversation-listening area when setting the second conversation-listening area, the robot position control section 35 causes the telepresence robot to evacuate to the outside of the second conversation-listening area.

With this arrangement, a user who uses the above telepresence robot may be evacuated from the second conversation-listening area following the evacuation of the above telepresence robot.

Consequently, the user who uses the above telepresence robot may be determined from listening to the private conversation.

Note that in the present embodiment, when a private conversation request is accepted, the robot position control section 35 causes the telepresence robot 1 present inside each of the first conversation-listening area and the second conversation-listening area to evacuate to the outside of the corresponding conversation-listening area. For this reason, afterwards, when a new private conversation request is received from an evacuated telepresence robot, and separate first and second conversation-listening areas are set, a case in which the telepresence robots 1 already being used for a private conversation exist inside the separate first and second conversation-listening areas does not occur.

FIG. 9 is a schematic diagram illustrating an example of a usage state of the communication system according to Embodiment 2 of the present disclosure. In FIG. 9, for example, suppose that the user UA and the user UC belong to the same company, and are present at separate points P1 and P2. Suppose that the telepresence robot 1a of the point P1 and the telepresence robot 1c of the point P2 have an established communication connection with each other. Suppose that the user UA of the point P1 and the user UC of the point P2 are having a conversation through the telepresence robots 1a and 1c. In this situation, the user UA inputs a private conversation request into the telepresence robot 1a.

Subsequently, the cloud server 3 receives the private conversation request, and sets a region of fixed range based on the user UA as the first conversation-listening area at the point P1, and sets a region of fixed range based on the user UC as the second conversation-listening area at the point P2. Additionally, the cloud server 3 detects a telepresence robot not involved in the private conversation inside the first conversation-listening area as the first evacuation communication apparatus. In the example of FIG. 9, the telepresence robot 1b is detected as the first evacuation communication apparatus.

Also, the cloud server 3 detects a telepresence robot not involved in the private conversation inside the second conversation-listening area as the second evacuation communication apparatus. In the example of FIG. 9, the telepresence robot 1d is detected as the second evacuation communication apparatus.

The cloud server 3 generates a first evacuation order causing the telepresence robot 1b detected as the first evacuation communication apparatus to evacuate to the outside of the first conversation-listening area. The cloud server 3 associates the generated evacuation order with the telepresence robot 1b, and uses the communication section 31 to transmit this information to the telepresence robot 1b. The telepresence robot 1b receives and outputs the first evacuation order to the driving control section 18. The driving control section 18 of the telepresence robot 1b receives the first evacuation order, controls the motor 19, and moves to the outside of the first conversation-listening area.

In addition, the cloud server 3 generates a second evacuation order causing the telepresence robot 1d detected as the second evacuation communication apparatus to evacuate to the outside of the second conversation-listening area. The cloud server 3 associates the generated evacuation order with the telepresence robot 1d, and uses the communication section 31 to transmit this information to the telepresence robot 1d. The telepresence robot 1d receives and outputs the second evacuation order to the driving control section 18. The driving control section 18 of the telepresence robot 1d receives the second evacuation order, controls the motor 19, and moves to the outside of the second conversation-listening area.

In this way, the cloud server 3 causes the telepresence robot 1b to evacuate to the outside of the first conversation-listening area, and also causes the telepresence robot 1d to evacuate to the outside of the second conversation-listening area. With this arrangement, a third party using the telepresence robot 1b or the telepresence robot 1d may be deterred from listening to the private conversation, without putting the telepresence robots 1b and 1d into an unavailable state.

Figure 11:
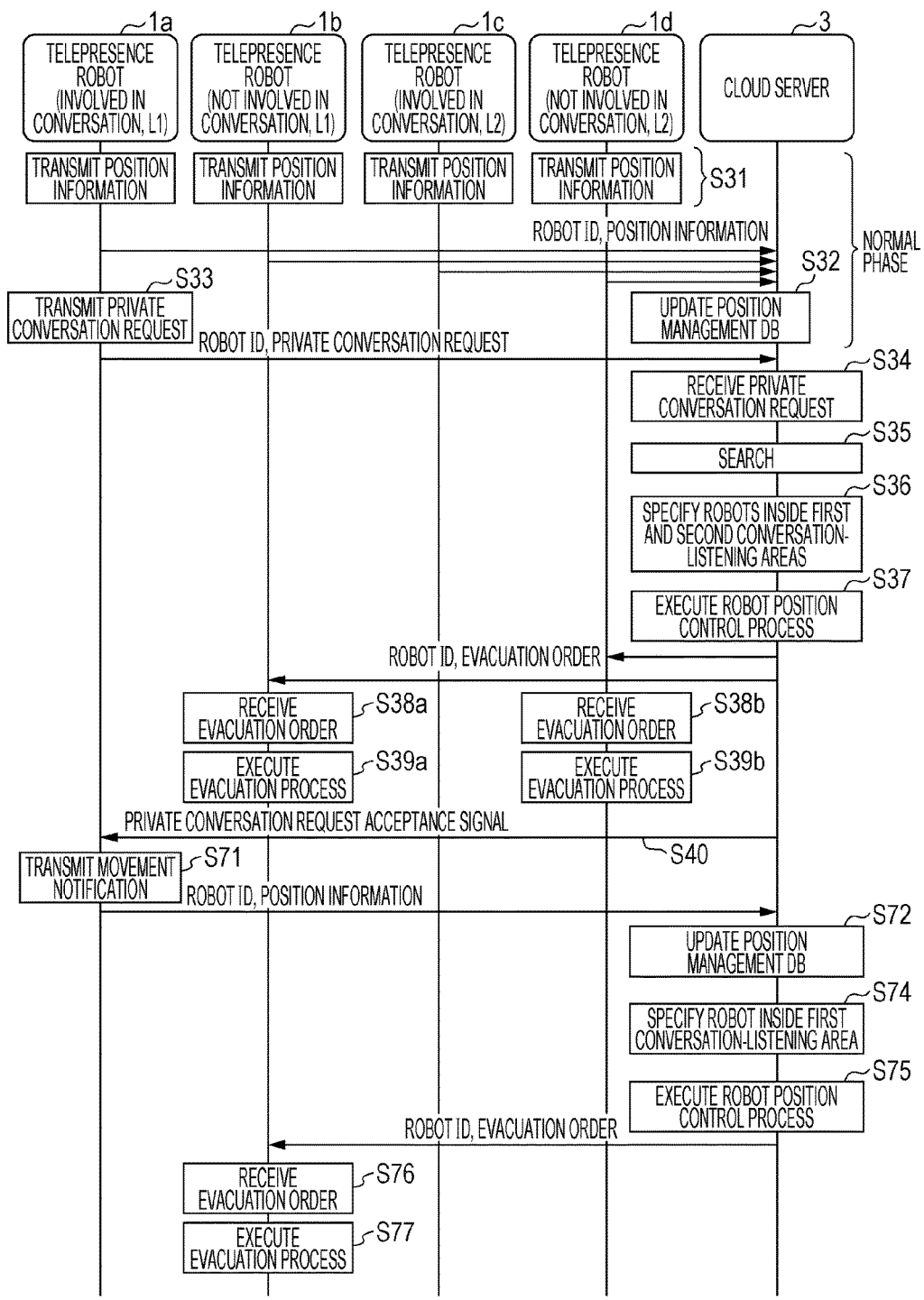
FIG. 11 is a sequence diagram illustrating an example of a process for setting first and second conversation-listening areas in the communication system according to Embodiment 2 of the present disclosure.

FIG. 11 is a sequence diagram illustrating an example of a process for setting a first conversation-listening area and a second conversation-listening area in the communication system according to Embodiment 2 of the present disclosure. In the example of FIG. 11, suppose that a communication connection has been established between the telepresence robot 1a and the telepresence robot 1c. Also, suppose that the telepresence robots 1a and 1b are positioned in the same local environment L1, and that the telepresence robots 1c and 1d are positioned in the same local environment L2.

The processes in S31 and S32 constitute the normal phase. In S31 and S32, similarly to S11 and S12 of FIG. 5, position information is periodically transmitted in association with the robot ID from each of the telepresence robots 1a to 1d, and the position management section 32 updates the position management DB 33 with the transmitted position information, and manages the current position of each of the telepresence robots 1a to 1d.

In S33, the private conversation request acquisition section 26 of the telepresence robot 1a acquires a private conversation request input by the user UA, and the communication section 17 of the telepresence robot 1a associates the private conversation request with the robot ID "a" of the telepresence robot 1a, and transmits this information to the cloud server 3.

In S34, the communication section 31 of the cloud server 3 receives and outputs the private conversation request to the private conversation request reception section 34, and the private conversation request reception section 34 receives and accepts the private conversation request from the communication section 31.

In S35, the communication status management section 36 references the communication status management DB 37, and searches for a telepresence robot 1 having an established communication connection with the telepresence robot 1a. Herein, the telepresence robot 1c is returned by the search.

In S36, the position management section 32 references the position management DB 33, and acquires the positions indicated by the position information of the telepresence robots 1a and 1c as position information indicating the position of each of the users UA and UC. Also, in S36, the position management section 32 sets the first conversation-listening area centered on the position of the user UA, and sets the second conversation-listening area centered on the position of the user UC.

Also, in S36, if there is a telepresence robot present inside the first conversation-listening area which is not involved in the private conversation, the position management section 32 detects the telepresence robot as the first evacuation communication apparatus, and in addition, if there is a telepresence robot present inside the second conversation-listening area which is not involved in the private conversation, the position management section 32 detects the telepresence robot as the second evacuation communication apparatus. Herein, the telepresence robot 1b is detected as the first evacuation communication apparatus, and the telepresence robot 1d is detected as the second evacuation communication apparatus. Note that in the case in which multiple telepresence robots are positioned inside the second conversation-listening area, the position management section 32 detects each of the multiple telepresence robots as the second evacuation communication apparatus.

In S37, the robot position control section 35 executes a robot position control process that causes the telepresence robot 1b detected as the first evacuation communication apparatus to evacuate from the first conversation-listening area, and also causes the telepresence robot 1d detected as the second evacuation communication apparatus to evacuate from the second conversation-listening area.

Specifically, in S37, the robot position control section 35 generates the first evacuation order causing the telepresence robot 1b detected as the first evacuation communication apparatus to evacuate to the outside of the first conversation-listening area, associates the generated first evacuation order with the robot ID of the telepresence robot 1b, and uses the communication section 31 to transmit this information to the telepresence robot 1b. Additionally, the robot position control section 35 generates the second evacuation order causing the telepresence robot 1d detected as the second evacuation communication apparatus to evacuate to the outside of the second conversation-listening area, associates the generated second evacuation order with the robot ID of the telepresence robot 1d, and uses the communication section 31 to transmit this information to the telepresence robot 1d.

The cloud server 3, by transmitting the first evacuation order to the telepresence robot 1b, causes the telepresence robot 1b to evacuate to the outside of the first conversation-listening area. Also, the cloud server 3, by transmitting the second evacuation order to the telepresence robot 1d, causes the telepresence robot 1d to evacuate to the outside of the second conversation-listening area.

In S38a, the communication section 17 of the telepresence robot 1b receives the first evacuation order. In S39a, the driving control section 18 of the telepresence robot 1b controls the motor 19, and executes the evacuation process that evacuates itself to the outside of the first conversation-listening area.

In S38b, the communication section 17 of the telepresence robot 1d receives the second evacuation order. In S39b, the driving control section 18 of the telepresence robot 1d controls the motor 19, and executes the evacuation process that evacuates itself to the outside of the second conversation-listening area.

In S40, the private conversation request reception section 34 of the cloud server 3 uses the communication section 31 to transmit an private conversation request acceptance signal to the telepresence robot 1a.

S71 to S77 indicate processes by which the user UA controls the telepresence robot 1a, and moves together with the telepresence robot 1a. At this time, the first conversation-listening area is updated to remain centered on the position of the telepresence robot 1a, that is, the position of the user UA. Also, in the case of determining that the telepresence robot 1b exists inside the updated first conversation-listening area, a third evacuation order causing the telepresence robot 1b to evacuate from the updated first conversation-listening area is generated, the generated third evacuation order is associated with the robot ID of the telepresence robot 1b, and the communication section 31 is used to transmit this information to the telepresence robot 1b. The communication section 17 of the telepresence robot 1b receives and outputs the third evacuation order to the driving control section 18. The driving control section 18 of the telepresence robot 1b controls the motor 19, and executes the evacuation process that evacuates itself to the outside of the updated first conversation-listening area.

In S71, a movement notification indicating that the telepresence robot la has moved since the private conversation request is transmitted to the cloud server 3. The movement notification includes the robot ID "a" and position information about the telepresence robot 1a.

Since S72 is a process similar to S32, a description is omitted.

In S74, the position management section 32 references the position management DB 33, and acquires the moved position information about the telepresence robot 1a as position information about the user UA. Also, in S74, the position management section 32 updates the first conversation-listening area to be centered on the moved position of the user UA.

Also, in S74, if there is a telepresence robot not involved in the private conversation which is present inside the updated first conversation-listening area, the position management section 32 detects the telepresence robot as the first evacuation communication apparatus. Herein, the case in which the telepresence robot 1b is detected from the first conversation-listening area will be described.

In S75, the robot position control section 35 executes a robot position control process that causes the telepresence robot 1b detected as the first evacuation communication apparatus to evacuate from the first conversation-listening area.

In S76, the communication section 17 of the telepresence robot 1b receives the evacuation order. In S77, the driving control section 18 of the telepresence robot 1b executes the evacuation process that evacuates the telepresence robot 1 from the first conversation-listening area.

Note that although the example from S71 to S77 illustrates a case in which the telepresence robot 1a moves, this is merely one example. The processes from S71 to S77 are also applicable to the case in which the user UC controls the telepresence robot 1c and moves together with the telepresence robot 1c. In this case, the second conversation-listening area is updated along with the movement of the telepresence robot 1c. In addition, the processes from S71 to S77 are also applicable to the case in which the telepresence robot 1a moves together with the user UA as a result of the user UC remotely controlling the telepresence robot 1a. In this case, the first conversation-listening area is updated along with the movement of the telepresence robot 1a. In addition, the processes from S71 to S77 are also applicable to the case in which the telepresence robot 1c moves together with the user UC as a result of the user UA remotely controlling the telepresence robot 1c. In this case, the second conversation-listening area is updated along with the movement of the telepresence robot 1c.

FIG. 12 is a sequence diagram illustrating an example of a process for canceling the setting of the first conversation-listening area and the second conversation-listening area in the communication system according to Embodiment 2 of the present disclosure.

In S51, in the telepresence robot 1a, if a disconnect request requesting to disconnect the communication connection with the telepresence robot 1c is input by the user UA, the private conversation request acquisition section 26 acquires the disconnect request, the communication section 17 associates the disconnect request with the robot ID of the telepresence robot 1a and current position information about the telepresence robot 1a, and transmits this information to the cloud server 3.

In S52, in the cloud server 3, the communication section 31 receives and outputs the disconnect request to the private conversation request reception section 34, and the private conversation request reception section 34 receives and accepts the disconnect request from the communication section 31.

In S53, the communication status management section 36 references the communication status management DB 37, and searches for a telepresence robot having an established communication connection with the telepresence robot 1a. Herein, the telepresence robot 1c is returned by the search.

In S54, the communication status management section 36 disconnects the communication connection between the telepresence robot 1a and the telepresence robot 1c. Note that the disconnect request may also be transmitted from the telepresence robot 1c by the user UC who is the communication peer of the user UA. In this case, the telepresence robot 1a having an established communication connection with the telepresence robot 1c is returned by the search by the communication status management section 36.

In S55, the cloud server 32 cancels the setting of the first and second conversation-listening areas corresponding to the disconnect request received in S52. Herein, the position management section 32 cancels the setting of the first conversation-listening area which is set based on the position of the user UA, and the setting of the second conversation-listening area which is set based on the position of the user UC.

In S56, the communication section 31 of the cloud server 3 transmits a disconnect request acceptance signal, which indicates that the disconnect request has been accepted, to the telepresence robot 1a. With this arrangement, for example, a message indicating that the communication connection has been disconnected is displayed on the display 21 of the telepresence robot 1a, and the cancellation of the communication connection is recognized by the first user. Also, for example, a message indicating that the communication connection has been disconnected is displayed on the display 21 of the telepresence robot 1c, and the cancellation of the communication connection is recognized by the second user.

In this way, according to the communication system according to Embodiment 2, if a private conversation request is input while in a state in which the user UA is on a call with the remote user UC through the telepresence robots 1a and 1c, the telepresence robot 1b close to the user UA is evacuated from the first conversation-listening area, and in addition, the telepresence robot 1d close to the user UC is also evacuated from the second conversation-listening area. For this reason, the telepresence robots 1b and 1d not involved in the private conversation no longer exist close to the user UA and the user UC.

Consequently, a third party corresponding to a user using the telepresence robot 1b no longer enters the first conversation-listening area by using the telepresence robot 1b. The same applies to the telepresence robot 1d.

In other words, a third party corresponding to a user using the telepresence robot 1d no longer enters the second conversation-listening area by using the telepresence robot 1d.

For this reason, in the case in which the user UA and the user UC are having a private conversation, the present embodiment is able to deter a third party using a telepresence robot 1 from listening to the private conversation and also from noticing that the private conversation is occurring, without putting the telepresence robots 1b and 1d into an unavailable state.

In addition, while the first conversation-listening area and the second conversation-listening area are set, entry into the first conversation-listening area and the second conversation-listening area by all telepresence robots 1 not involved in the private conversation is prohibited. For this reason, while the first and second conversation-listening areas are set, the present embodiment is able to deter a third party not involved in the private conversation from entering the first and second conversation-listening areas by using a telepresence robot 1, and deter the third party from listening to the private conversation.

Modification 1

In Embodiment 2, the telepresence robot 1 is adopted as the first communication apparatus, but the present disclosure is not limited thereto, and the user terminal 4 may also be treated as the first communication apparatus. In this case, the user terminal 4 is assumed to have an established communication connection with the telepresence robot 1c.

Modification 2

In Embodiment 1, when evacuating the first evacuation communication apparatus to the outside of the first conversation-listening area, the robot position control section 35 monitors the current position of the first evacuation communication apparatus, and transmits a stop order after confirming that the first evacuation communication apparatus has evacuated to the outside of the first conversation-listening area.

In Embodiment 2, when evacuating the second evacuation communication apparatus to the outside of the second conversation-listening area, the robot position control section 35 additionally monitors the current position of the second evacuation communication apparatus, and transmits a stop order after confirming that the second evacuation communication apparatus has evacuated to the outside of the second conversation-listening area.

However, this is merely one example. For example, if the telepresence robot 1 is provided with a function of using a technology such as simultaneous localization and mapping (SLAM) to create a surrounding environment map, and reference the environment map to estimate one's own position, the robot position control section 35 does not have to monitor the current position of each of the first evacuation communication apparatus and the second evacuation communication apparatus.

In this case, when the driving control section 18 of the first evacuation communication apparatus receives an evacuation order from the cloud server 3, it is sufficient to set a predetermined position outside the first conversation-listening area as a goal position, and control the motor 19 to cause oneself to travel autonomously towards the goal position.

Also, when the driving control section 18 of the second evacuation communication apparatus receives an evacuation order from the cloud server 3, it is sufficient to set a predetermined position outside the second conversation-listening area as a goal position, and control the motor 19 to cause oneself to travel autonomously towards the goal position.

In addition, the robot position control section 35 may also report information about the first conversation-listening area and the second conversation-listening area to all telepresence robots being managed.

Subsequently, it is sufficient for the driving control section 18 of a telepresence robot 1 not involved in the private conversation to control the telepresence robot 1 not to enter the first conversation-listening area and the second conversation-listening area autonomously.

Modification 3

If a telepresence robot 1 is provided with the localization function indicated in Modification 2, the position information acquisition section 16 of the telepresence robot 1 may also periodically transmit one's own location detected using the localization function to the cloud server 3.

Modification 4

In Embodiment 2, the user UA inputs the private conversation request, but the user UC may also input the private conversation request. Also, in Embodiment 2, a single telepresence robot 1b or 1d is detected as the first evacuation communication apparatus or the second evacuation communication apparatus, but this is merely an example.

In the case in which multiple telepresence robots are positioned inside the first conversation-listening area, each of the multiple telepresence robots is detected as the first evacuation communication apparatus.

In the case in which multiple telepresence robots are positioned inside the second conversation-listening area, each of the multiple telepresence robots is detected as the second evacuation communication apparatus.

According to the present disclosure, a private conversation may be held without putting a telepresence robot not involved in the private conversation into an unavailable state, which is useful in anticipated future office environments where telepresence robots are present.

What is claimed is:

1. A communication control method of a communication control apparatus that controls a first communication apparatus used by a first user inside a first space, and one or a plurality of self-propelled second communication apparatus placed inside the first space,
the communication control apparatus being provided with a position management database in which position information indicating a current position of each of the one or plurality of second communication apparatus is registered,
the method comprising:
receiving a private conversation request that requests a private conversation from the first communication apparatus;
acquiring a position of the first user when the private conversation request is input into the first communication apparatus by the first user;
setting a region of fixed range based on the position of the first user as a first conversation-listening area;
detecting, based on the position management database, a second communication apparatus positioned inside the first conversation-listening area from among the one or plurality of second communication apparatus as a first evacuation communication apparatus; and
transmitting, to the first evacuation communication apparatus, an evacuation order causing the first evacuation communication apparatus to evacuate to an outside of the first conversation-listening area.

2. The communication control method according to claim 1, wherein
after receiving the private conversation request, if a private conversation cancellation request that requests cancellation of the private conversation request is received from the first communication apparatus, the setting of the first conversation-listening area is canceled.

3. The communication control method according to claim 1, wherein
the first evacuation communication apparatus includes a second communication apparatus having an established communication connection with a third communication apparatus placed inside a second space separate from the first space.

4. The communication control method according to claim 1, wherein
the communication control apparatus additionally controls one or a plurality of self-propelled third communication apparatus placed in the second space, and
in the position management database, position information indicating the current position of each of the one or plurality of third communication apparatus is registered,
the communication control method further comprising:
acquiring a position of a second user inside the second space who uses the third communication apparatus in a case in which the input of the private conversation request is received from the first communication apparatus in a state of an established communication connection between the first communication apparatus and one among the one or plurality of third communication apparatus;
setting a region of fixed range based on the position of the second user as a second conversation-listening area;
detecting, based on the position management database, a third communication apparatus positioned inside the second conversation-listening area and also different from the third communication apparatus having an established communication connection with the first communication apparatus from among the one or plurality of third communication apparatus as a second evacuation communication apparatus; and
transmitting, to the second evacuation communication apparatus, an evacuation order causing the second evacuation communication apparatus to evacuate to an outside of the second conversation-listening area.

5. The communication control method according to claim 4, wherein
after receiving the private conversation request, if a disconnect request that requests disconnection of the communication connection is received from the first communication apparatus or the third communication apparatus having an established communication connection with the first communication apparatus, the communication connection between the first communication apparatus and the third communication apparatus having an established communication connection with the first communication apparatus is disconnected, and
the setting of the first conversation-listening area and the second conversation-listening area is canceled.

6. The communication control method according to claim 4, wherein
the second evacuation communication apparatus includes a third communication apparatus having an established communication connection with the second communication apparatus.

7. The communication control method according to claim 3, wherein
each of the one or plurality of second communication apparatus is configured as a telepresence robot that presents a message transmitted from the third communication apparatus with which a communication connection is established, and
the telepresence robot is provided with
a communicator that transmits the message to the third communication apparatus with which the communication connection is established,
an autonomous movement controller that causes the telepresence robot to move autonomously, and
a presenter that presents the message received from the third communication apparatus with which the communication connection is established to a user who uses the telepresence robot.

8. The communication control method according to claim 1, wherein
when the private conversation request is received, position information indicating the current position of the first communication apparatus additionally is received, and the position indicated by the position information of the first communication apparatus is acquired as the position of the first user.

9. The communication control method according to claim 4, wherein
when the private conversation request is received, the position of the third communication apparatus is acquired from the position management database, and the acquired position of the third communication apparatus is acquired as the position of the second user.

10. The communication control method according to claim 1, wherein
while the first conversation-listening area is set, if a second communication apparatus entering the first conversation-listening area is detected from among the one or plurality of second communication apparatus, an evacuation order causing the entering second communication apparatus to evacuate to the outside of the first conversation-listening area is transmitted to the entering second communication apparatus.

11. The communication control method according to claim 1, wherein
in the detection of the first evacuation communication apparatus, if there are multiple second communication apparatus positioned inside the first conversation-listening area, each of the multiple second communication apparatus is detected as the first evacuation communication apparatus.

12. The communication control method according to claim 4, wherein
in the detection of the first evacuation communication apparatus, if there are multiple second communication apparatus positioned inside the first conversation-listening area, each of the multiple second communication apparatus is detected as the first evacuation communication apparatus, and
in the detection of the second evacuation communication apparatus, if there are multiple third communication apparatus positioned inside the second conversation-listening area, each of the multiple third communication apparatus is detected as the second evacuation communication apparatus.

13. A communication control apparatus that controls a first communication apparatus used by a first user inside a first space, and one or a plurality of self-propelled second communication apparatus placed inside the first space, the communication control apparatus comprising:
a position management database in which position information indicating a current position of each of the one or plurality of second communication apparatus is registered;
a private conversation request receiver that receives a private conversation request that requests a private conversation from the first communication apparatus;
a position manager that acquires a position of the first user when the private conversation request is input into the first communication apparatus by the first user, sets a region of fixed range based on the acquired position of the first user as a second conversation-listening area, and detects, based on the position management database, a second communication apparatus positioned inside the first conversation-listening area from among the one or plurality of second communication apparatus as a first evacuation communication apparatus; and
a robot position controller that transmits, to the first evacuation communication apparatus, an evacuation order causing the first evacuation communication apparatus to evacuate to an outside of the first conversation-listening area.

14. A telepresence robot comprising:
a communicator that communicates with the communication control apparatus according to claim 11;
an autonomous movement controller that causes the telepresence robot to move autonomously, and
a presenter that presents a message.

15. A non-transitory recording medium storing a program, the program causing a computer to execute a process comprising:
receiving a private conversation request indicating that a first user inside a first space is requesting a private conversation input into a first communication apparatus;
acquiring a position of the first user when the private conversation request is input;
setting a region of fixed range based on the position of the first user as a first conversation-listening area;
detecting, based on position information registered in a position management database, the position information indicating a current position of each of one or a plurality of self-propelled second communication apparatus placed inside the first space, a second communication apparatus positioned inside the first conversation-listening area from among the one or plurality of second communication apparatus as a first evacuation communication apparatus; and
transmitting, to each first evacuation communication apparatus, an evacuation order causing the first evacuation communication apparatus to evacuate to an outside of the first conversation-listening area.

* * * * *